Figure 1:
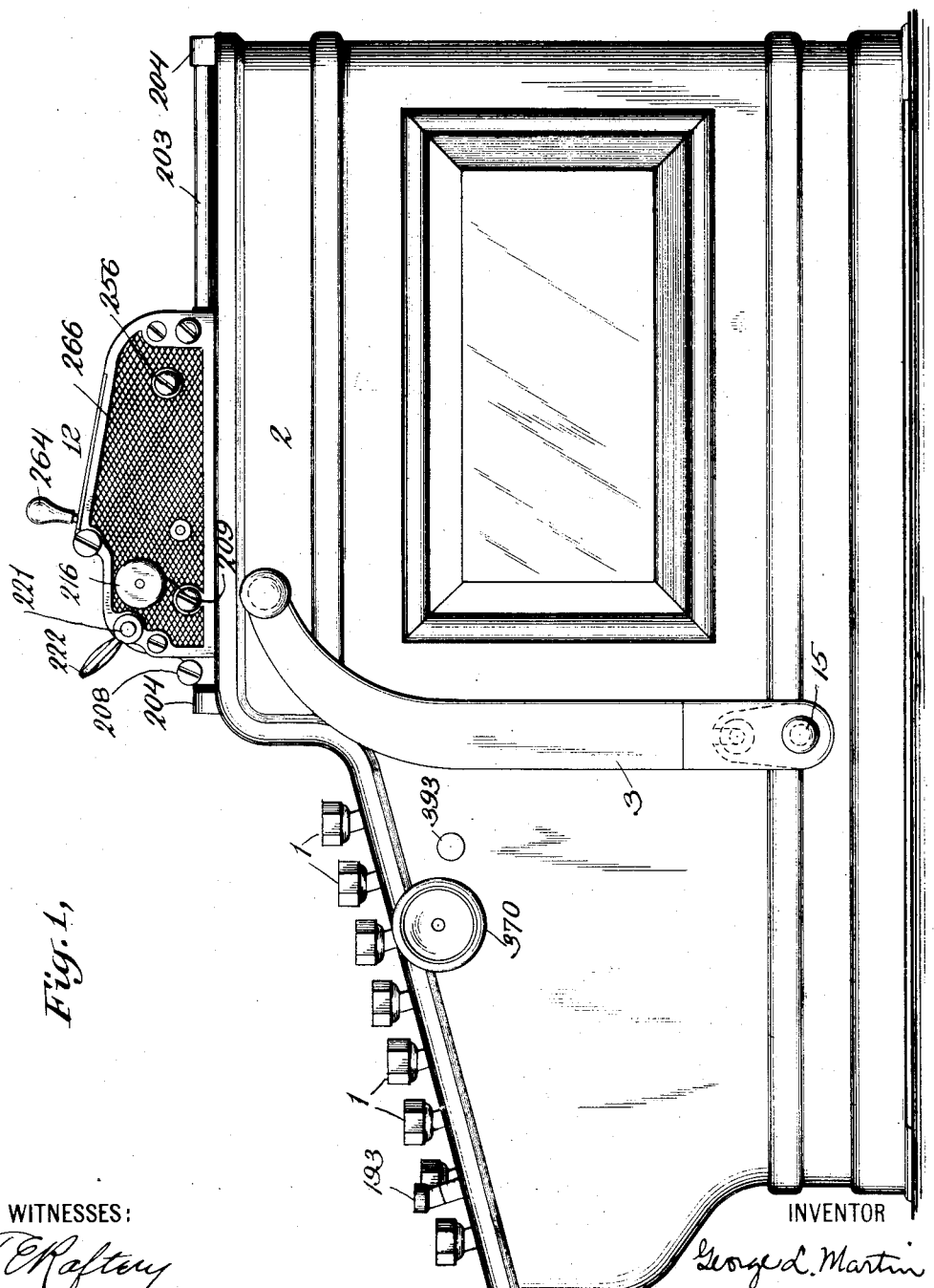

No. 831,085. PATENTED SEPT. 18, 1906.
G. L. MARTIN.
CALCULATING MACHINE.
APPLICATION FILED FEB. 2, 1905.

17 SHEETS—SHEET 1.

WITNESSES:
T. E. Raftery
John O. Gempler.

INVENTOR
George L. Martin
BY
Kenyon & Kenyon
ATTORNEYS

No. 831,085. PATENTED SEPT. 18, 1906.
G. L. MARTIN.
CALCULATING MACHINE.
APPLICATION FILED FEB. 2, 1905.

17 SHEETS—SHEET 2.

WITNESSES:

INVENTOR
George L. Martin
BY
Kenyon & Kenyon
ATTORNEYS

No. 831,085. PATENTED SEPT. 18, 1906.
G. L. MARTIN.
CALCULATING MACHINE.
APPLICATION FILED FEB. 2, 1905.

17 SHEETS—SHEET 4.

WITNESSES: INVENTOR
George L. Martin
BY
Kenyon & Kenyon
ATTORNEYS

No. 831,085. PATENTED SEPT. 18, 1906.
G. L. MARTIN.
CALCULATING MACHINE.
APPLICATION FILED FEB. 2, 1905.

17 SHEETS—SHEET 5.

WITNESSES:
T. E. Raftery
John O. Gempler

INVENTOR
George L. Martin
BY
Kenyon & Kenyon
ATTORNEYS

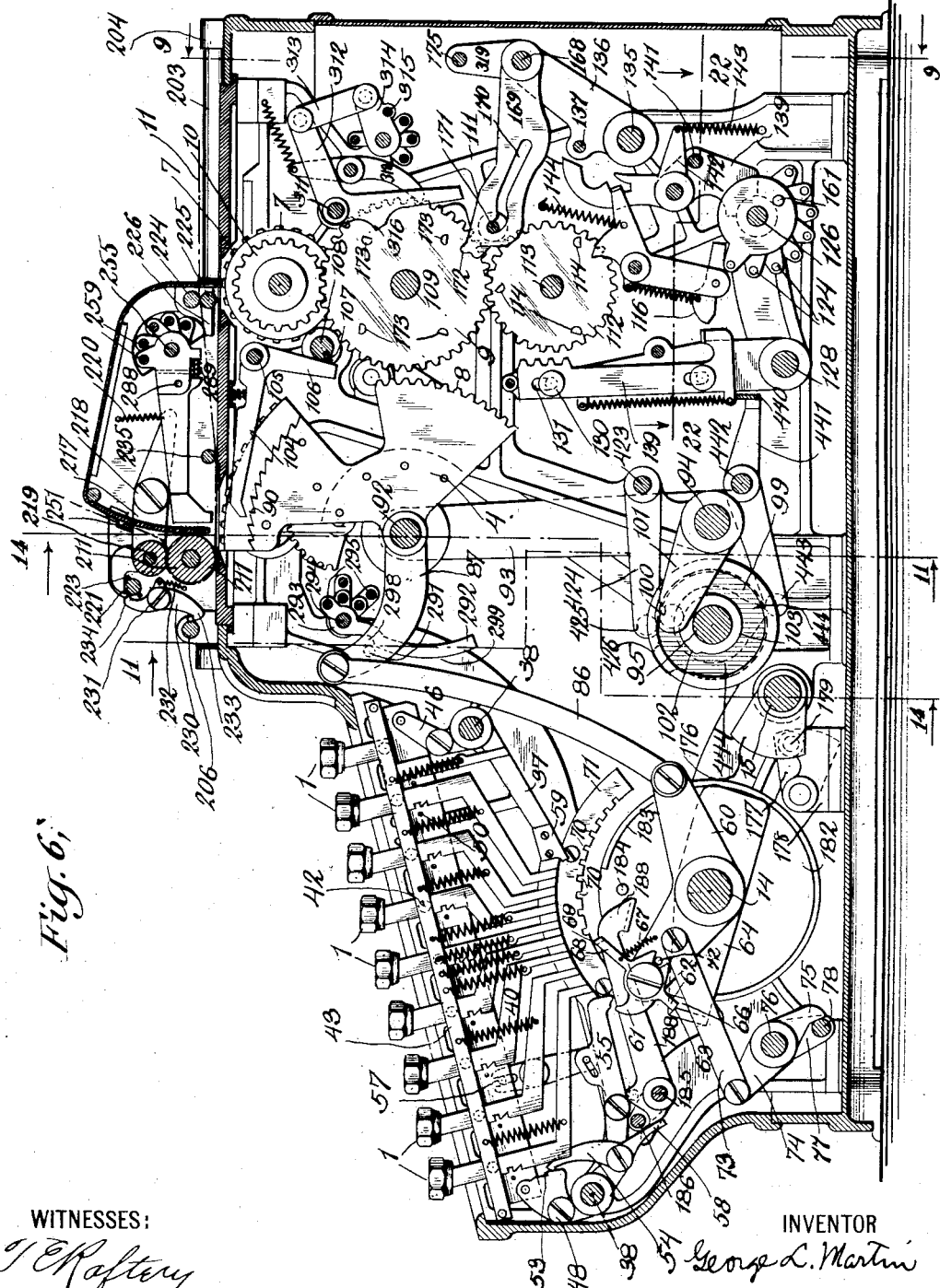

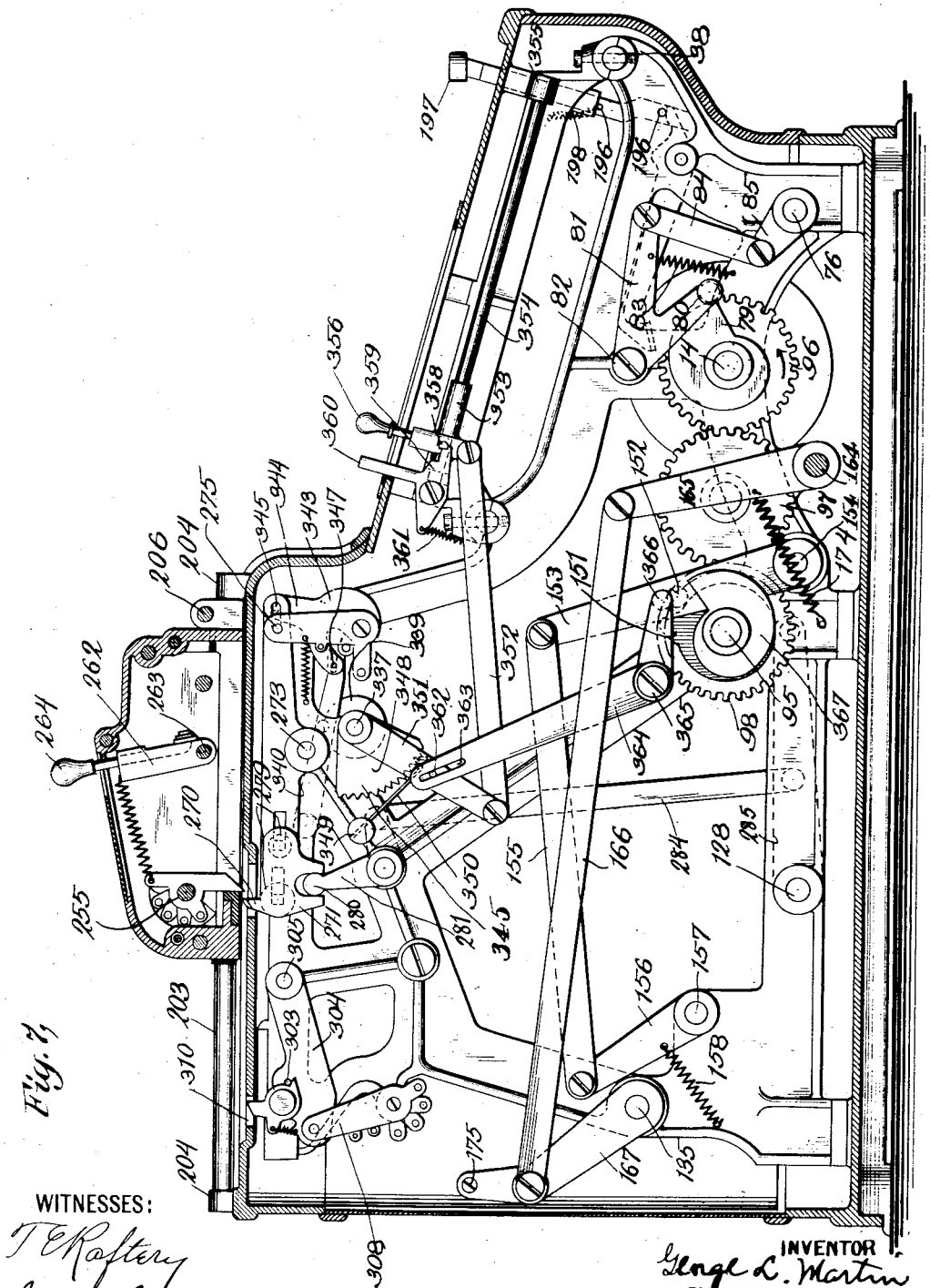

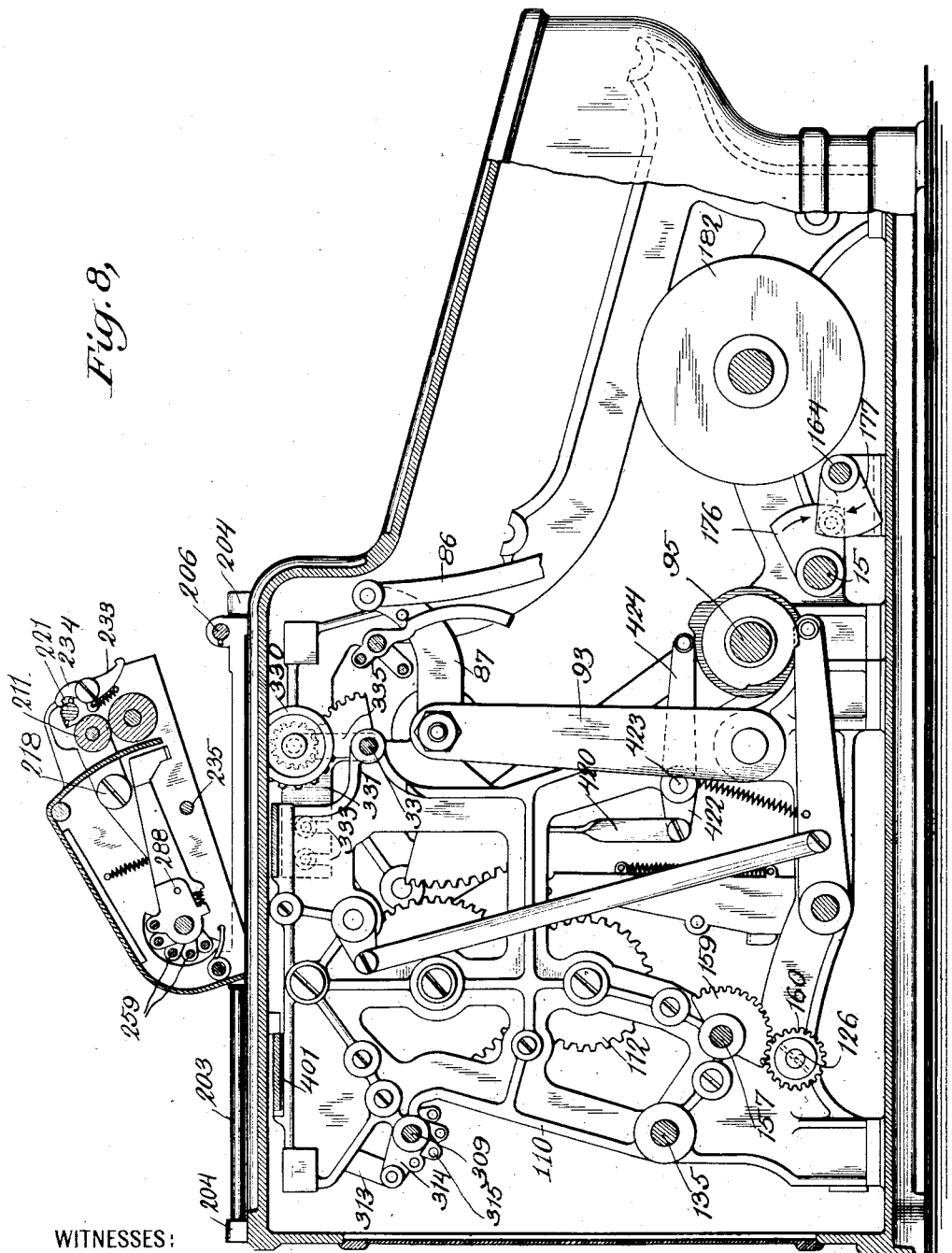

No. 831,085. PATENTED SEPT. 18, 1906.
G. L. MARTIN.
CALCULATING MACHINE.
APPLICATION FILED FEB. 2, 1905.
17 SHEETS—SHEET 9.
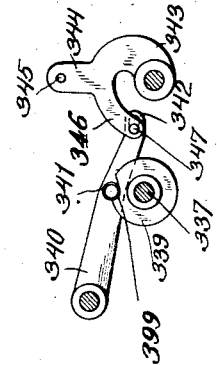
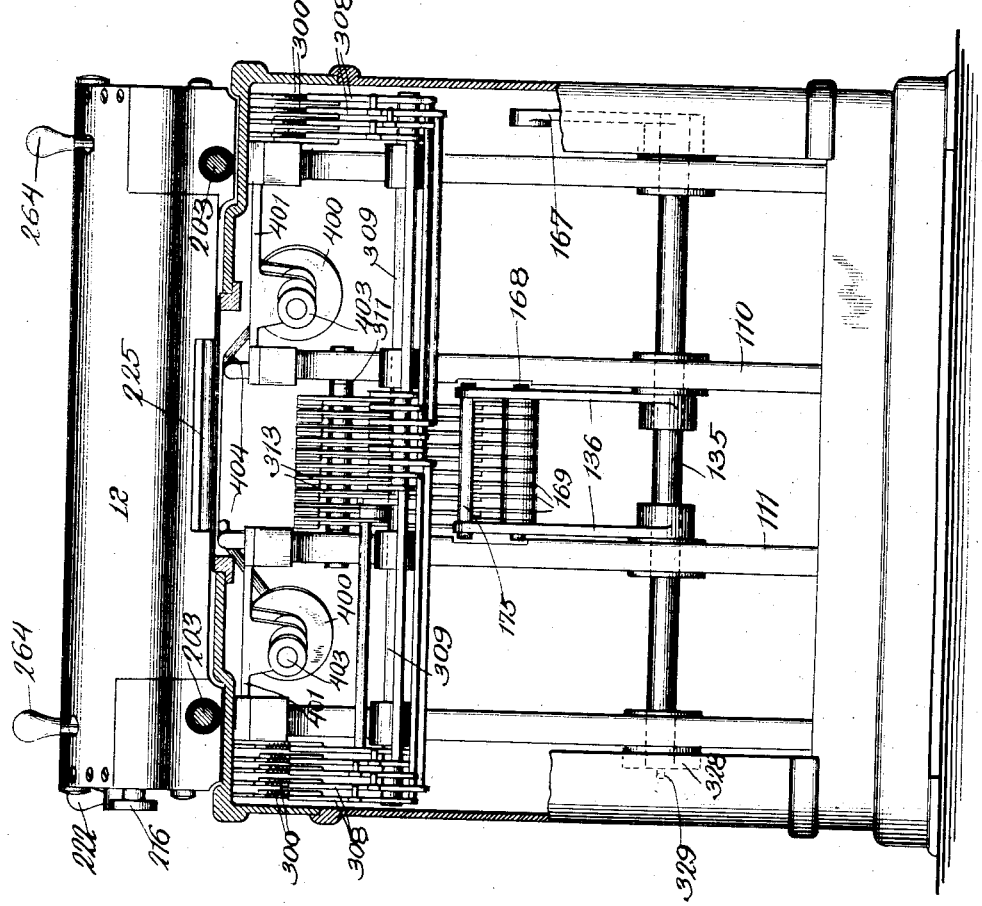
WITNESSES:
INVENTOR
George L. Martin
BY
Kenyon & Kenyon
ATTORNEYS No. 831,085. PATENTED SEPT. 18, 1906.
G. L. MARTIN.
CALCULATING MACHINE.
APPLICATION FILED FEB. 2, 1905.
17 SHEETS—SHEET 10.
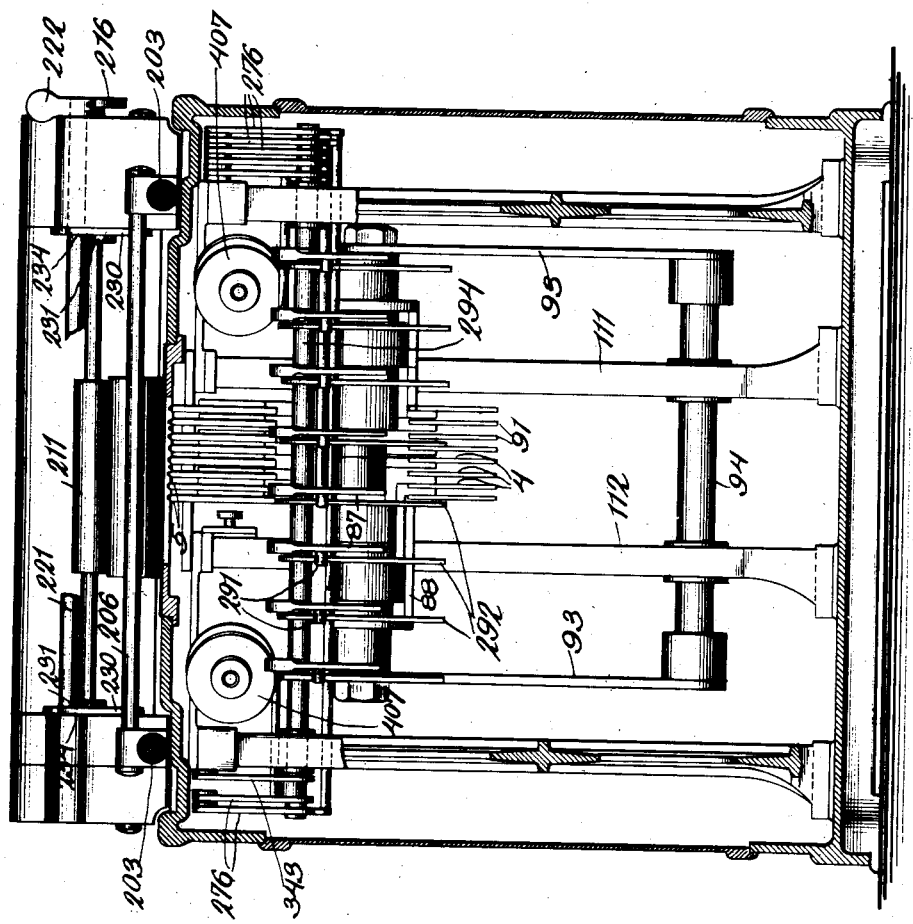
WITNESSES:
INVENTOR
George L. Martin
BY
Kenyon & Kenyon
ATTORNEYS No. 831,085. PATENTED SEPT. 18, 1906.
G. L. MARTIN.
CALCULATING MACHINE.
APPLICATION FILED FEB. 2, 1905.

17 SHEETS—SHEET 11.

WITNESSES:

INVENTOR
George L. Martin
BY
Kenyon & Kenyon
ATTORNEYS

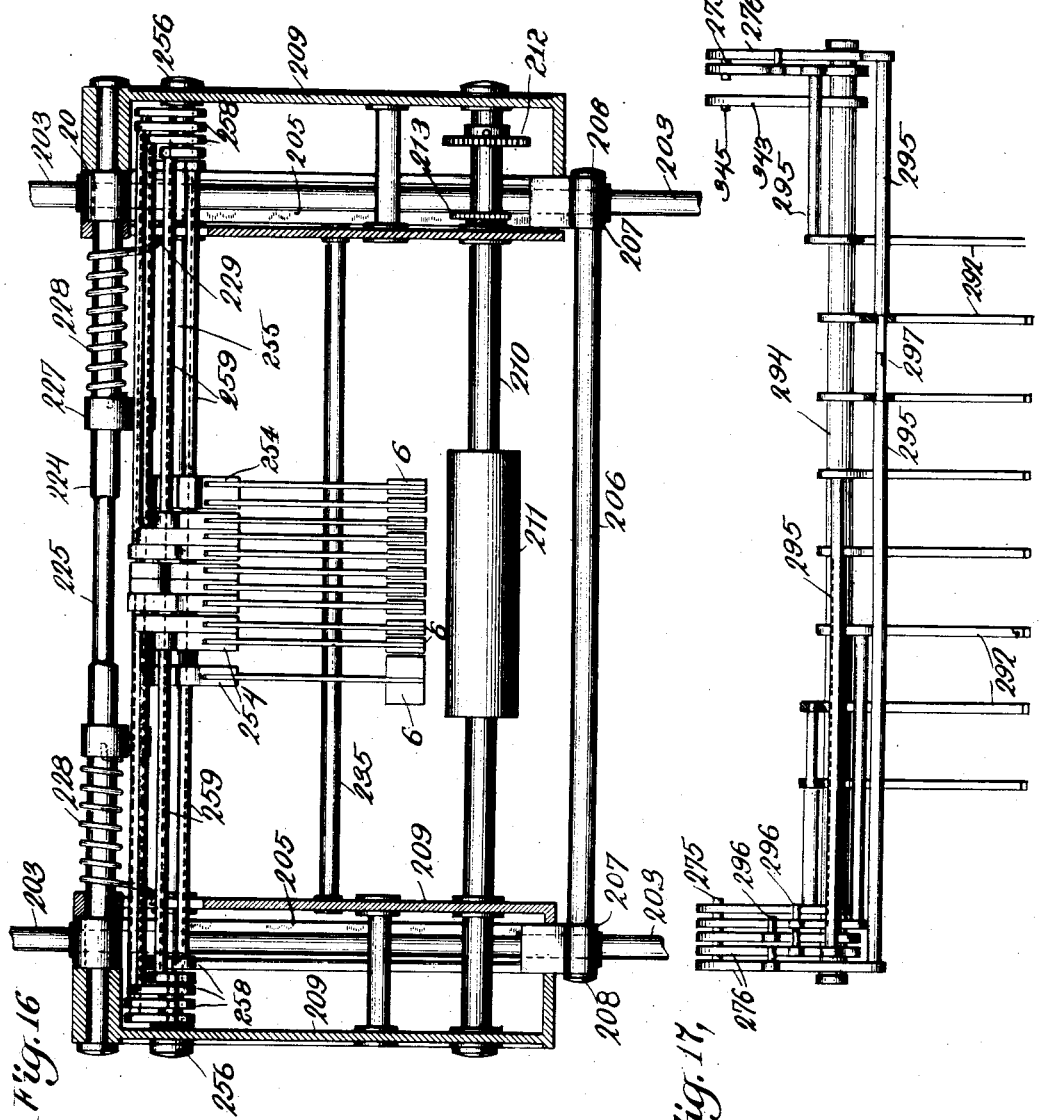

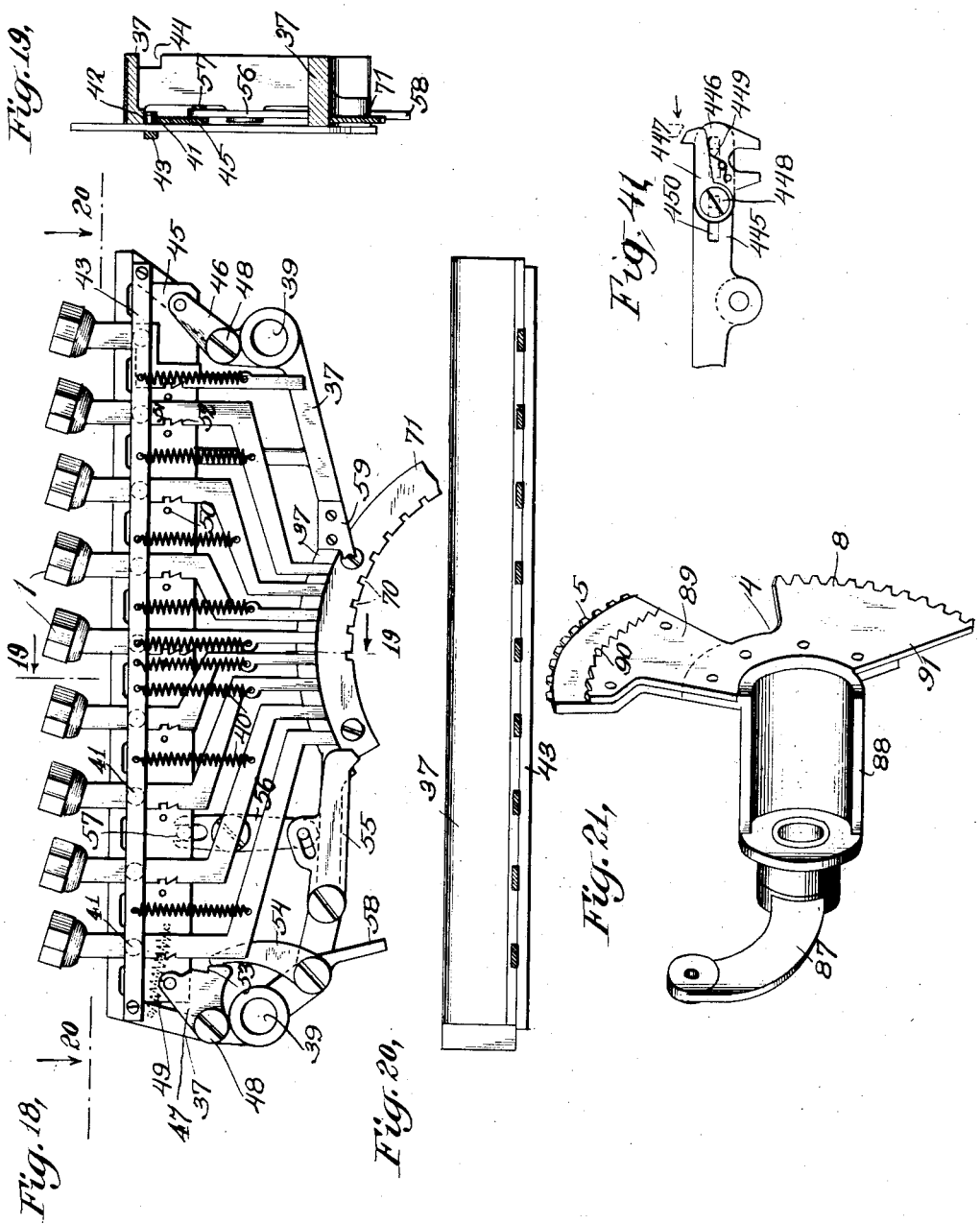

No. 831,085. PATENTED SEPT. 18, 1906.
G. L. MARTIN.
CALCULATING MACHINE.
APPLICATION FILED FEB. 2, 1905.
17 SHEETS—SHEET 14.
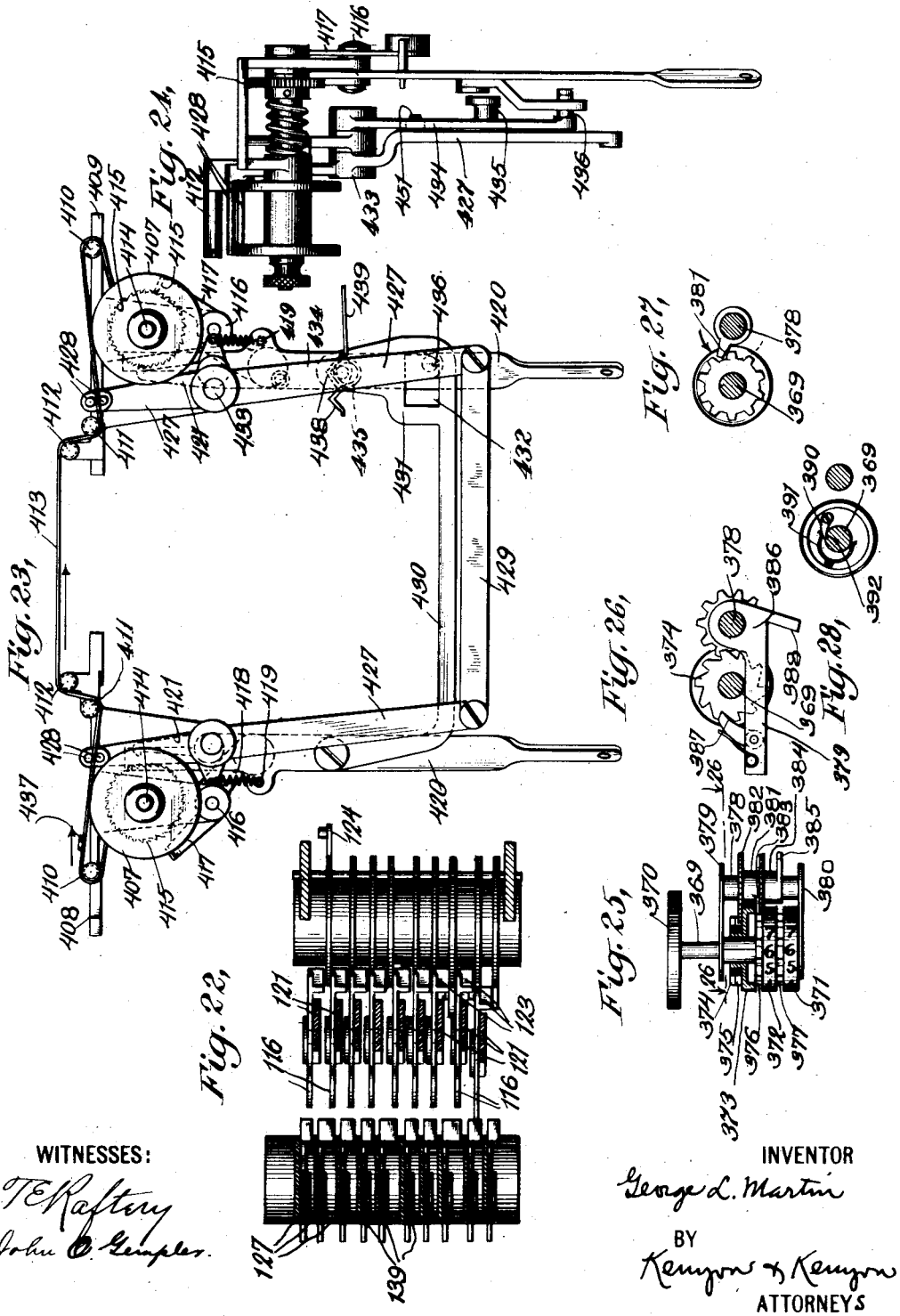
WITNESSES:
INVENTOR
George L. Martin
BY
Kenyon & Kenyon
ATTORNEYS No. 831,085. PATENTED SEPT. 18, 1906.
G. L. MARTIN.
CALCULATING MACHINE.
APPLICATION FILED FEB. 2, 1905.
17 SHEETS—SHEET 15.
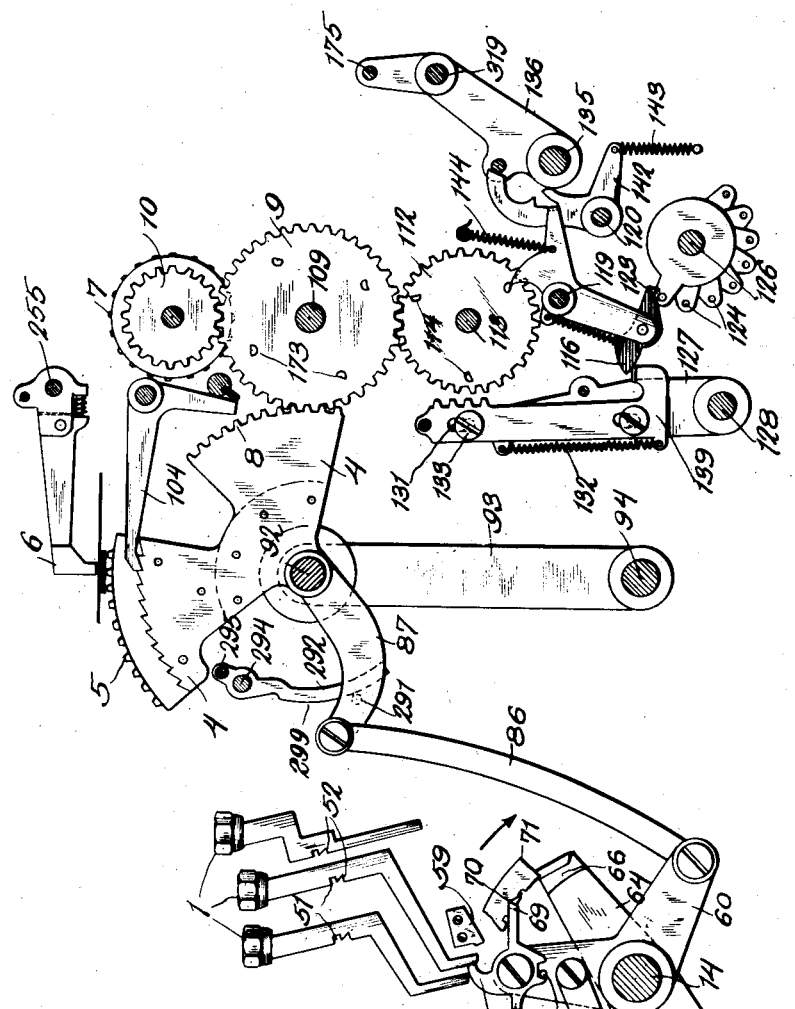
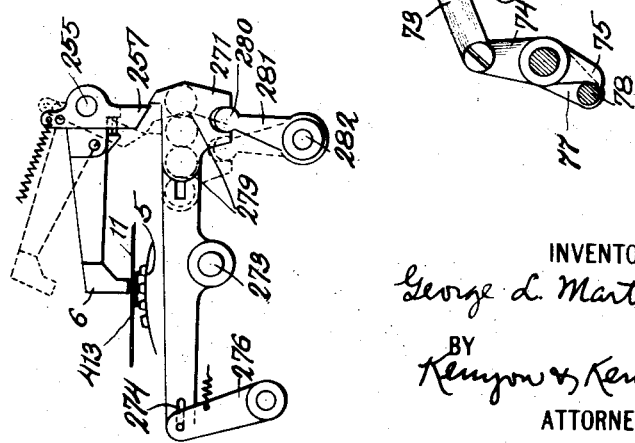
WITNESSES:
T. E. Raftery
John O. Gempler
INVENTOR
George L. Martin
BY
Kenyon & Kenyon
ATTORNEYS No. 831,085. PATENTED SEPT. 18, 1906.
G. L. MARTIN.
CALCULATING MACHINE.
APPLICATION FILED FEB. 2, 1905.
17 SHEETS—SHEET 16.
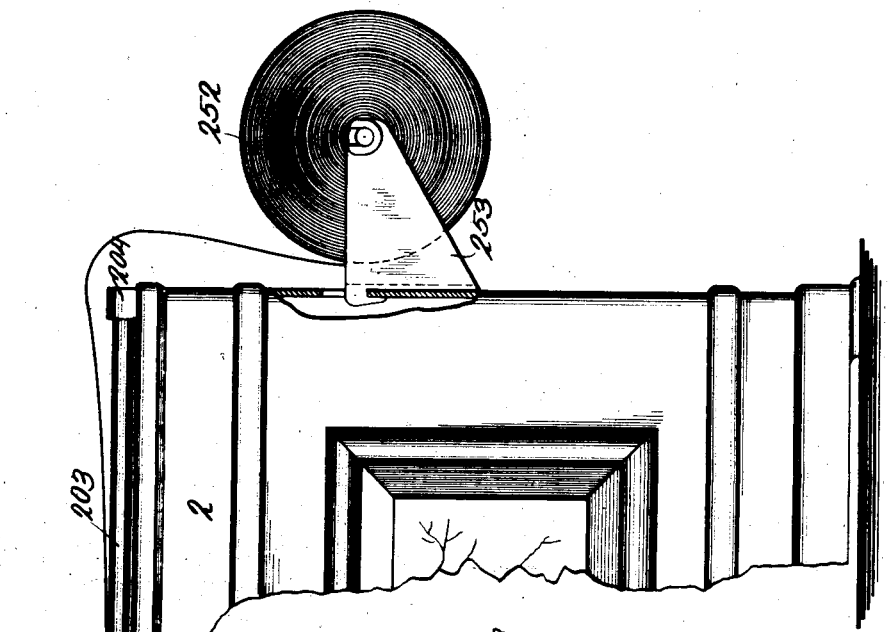
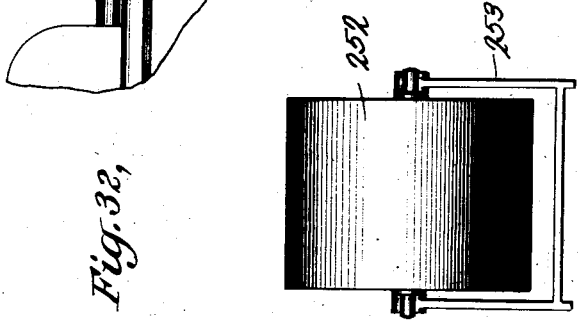
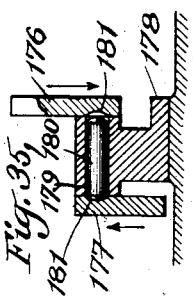
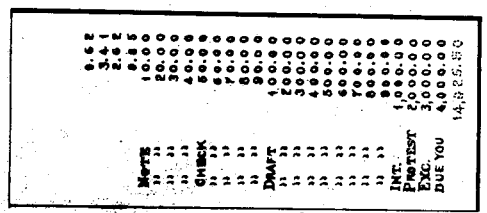
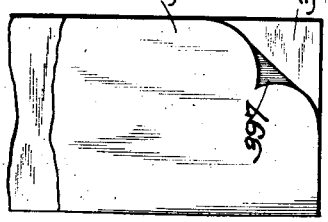
WITNESSES:
INVENTOR
George L. Martin
BY
Kenyon & Kenyon
ATTORNEYS No. 831,085. PATENTED SEPT. 18, 1906.
G. L. MARTIN.
CALCULATING MACHINE.
APPLICATION FILED FEB. 2, 1905.
17 SHEETS—SHEET 17.
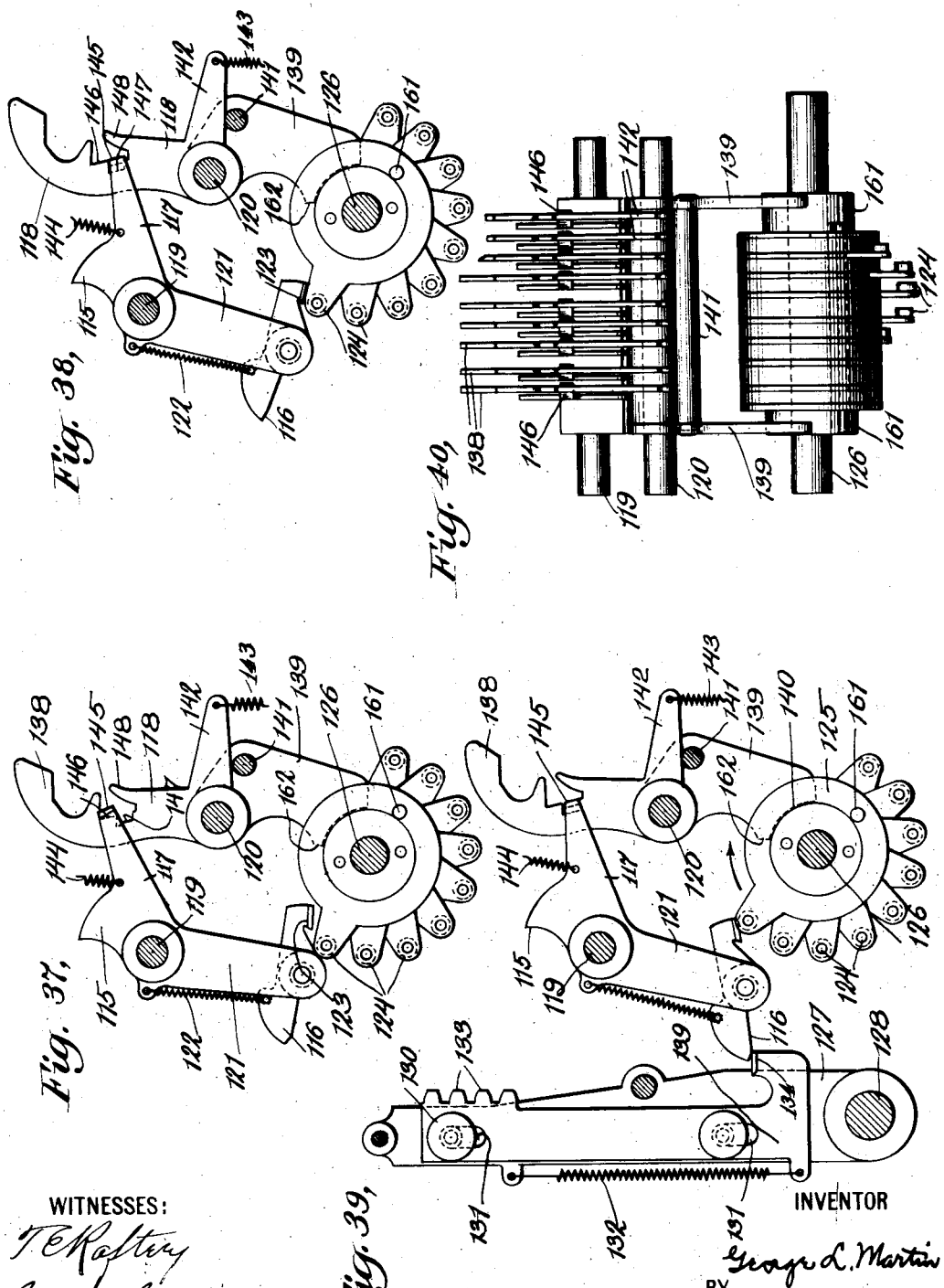
WITNESSES:
INVENTOR
George L. Martin
BY
Kenyon & Kenyon
ATTORNEYS

UNITED STATES PATENT OFFICE.

GEORGE L. MARTIN, OF BINGHAMTON, NEW YORK, ASSIGNOR TO BUNDY MANUFACTURING COMPANY, A CORPORATION OF NEW YORK.

CALCULATING-MACHINE.

No. 831,085.     Specification of Letters Patent.     Patented Sept. 18, 1906.

Application filed February 2, 1905. Serial No. 243,856.

*To all whom it may concern:*

Be it known that I, GEORGE L. MARTIN, a citizen of the United States, and a resident of Binghamton, county of Broome, State of New York, have invented new and useful Improvements in Calculating-Machines, of which the following is a specification.

My invention relates to calculating-machines and to machines for bringing suitable characters upon a printing, reading, or adding line.

It has for its object to improve and simplify such machines and to make them more certain and accurate in operation; also, to improve the means for starting and moving the type-bearing devices or type-segments and bringing them into mesh with the adding-wheels and to make such intermeshing more easily accomplished and less liable to binding; also, to provide new and more accurate carrying mechanism, preferably normally out of operative engagement and preferably positively actuated, and to simplify and improve the carrying mechanism of calculating-machines; also, to provide an interlock between the main operating member and the resetting member to prevent the operation of one after the other has begun its operation.

In the drawings accompanying this specification and forming part hereof I have shown one form of embodiment of my invention, which I will now proceed to describe. My invention as there shown is embodied in a machine provided with a bank of keys of the usual character and arranged to bring upon a printing-line numbers corresponding to the value of the keys depressed and to print the said numbers upon a suitable record-strip and also to add such numbers upon a set of adding-wheels and when desired to print the total represented by such adding-wheels.

Figure 2:
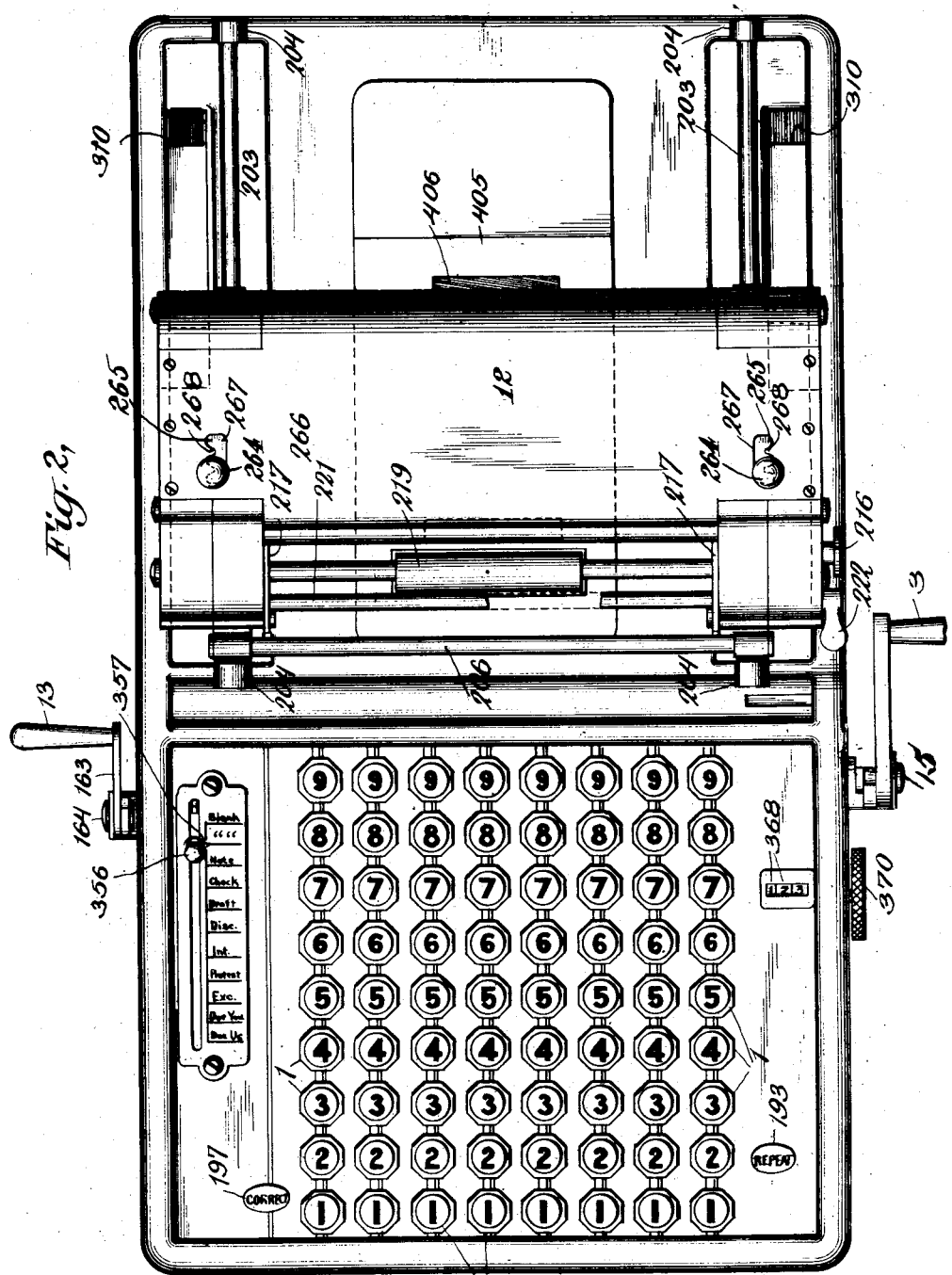
Figure 3:
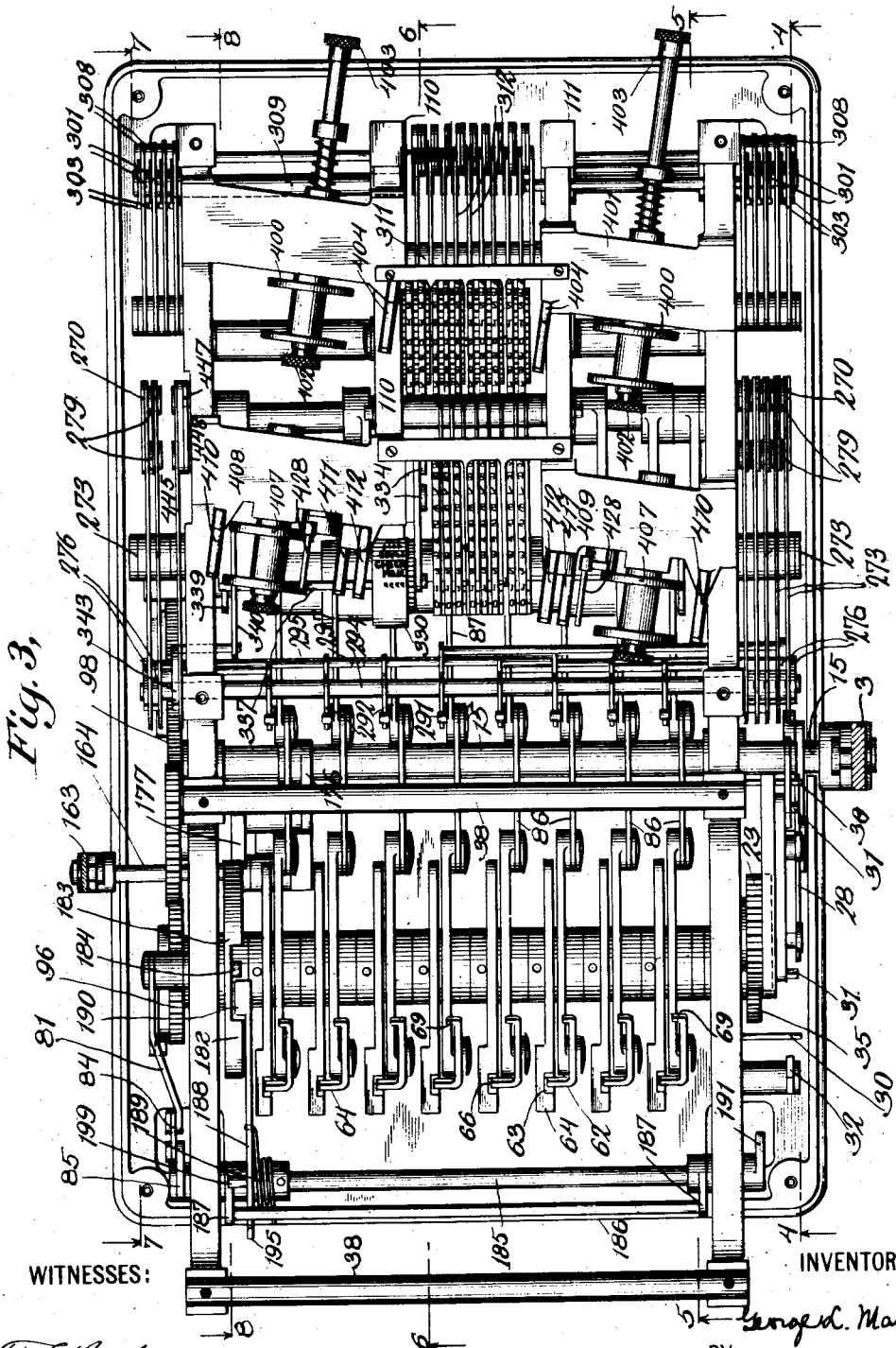
Figure 4:
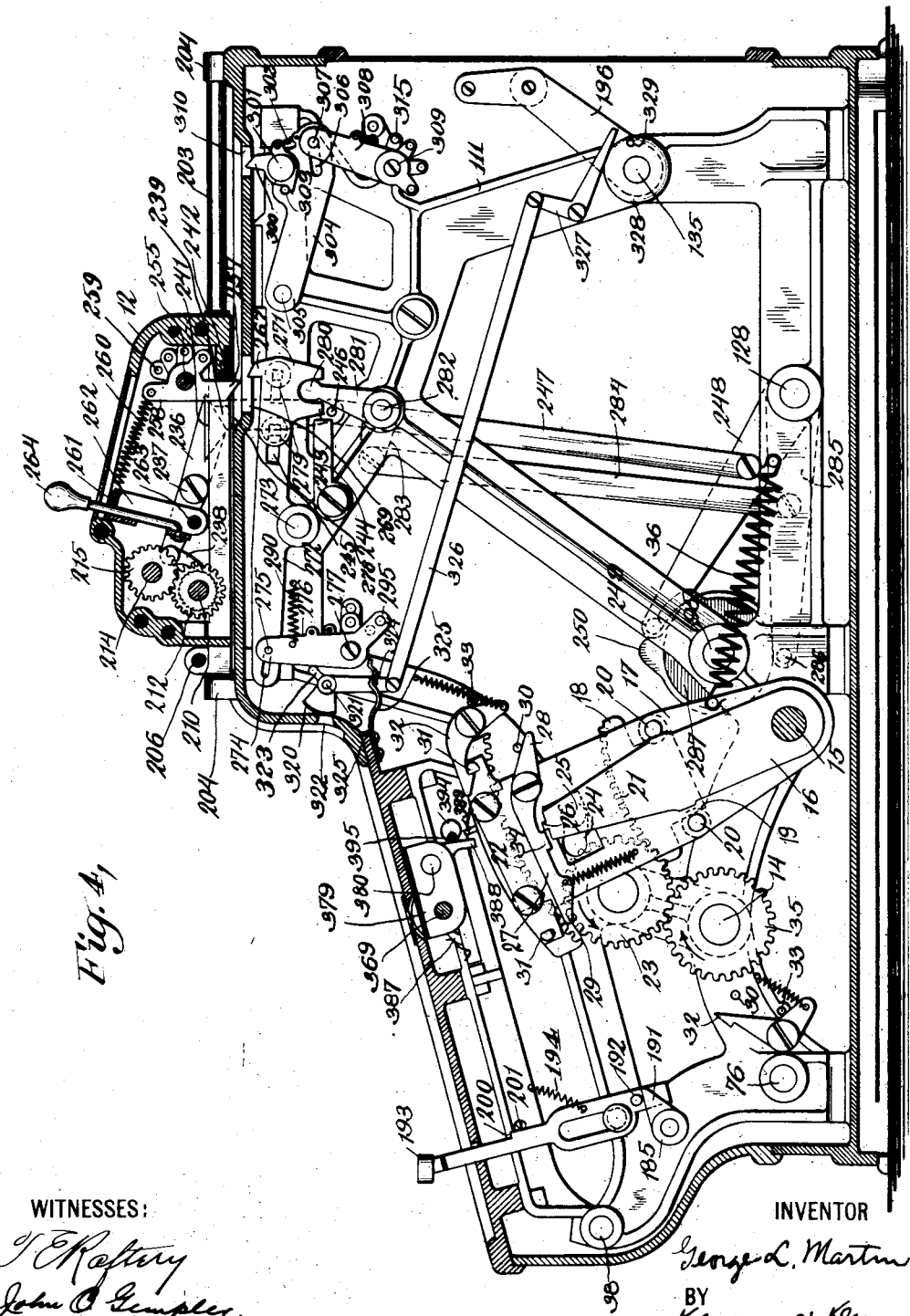
Figure 5:
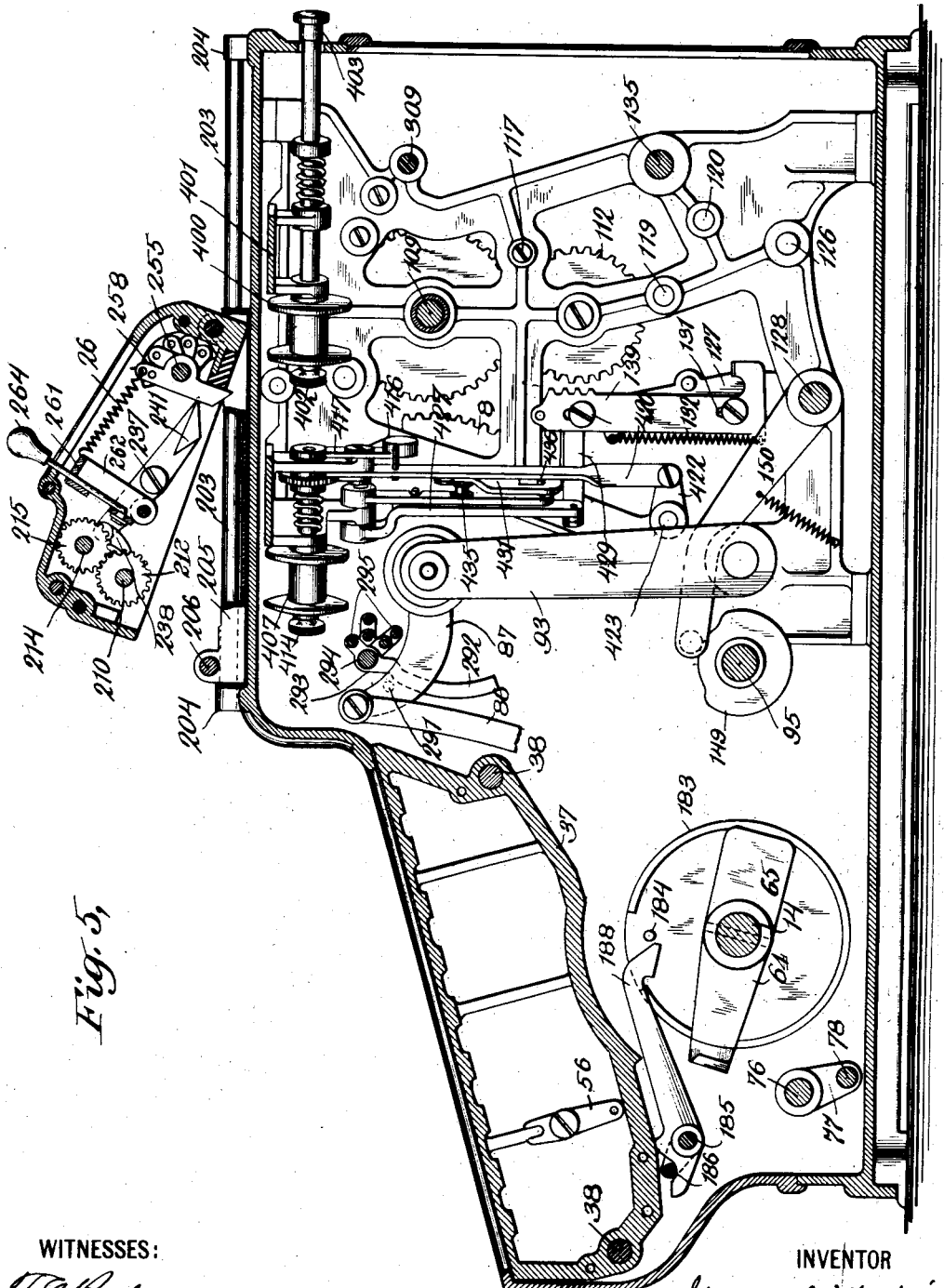
Figure 14:
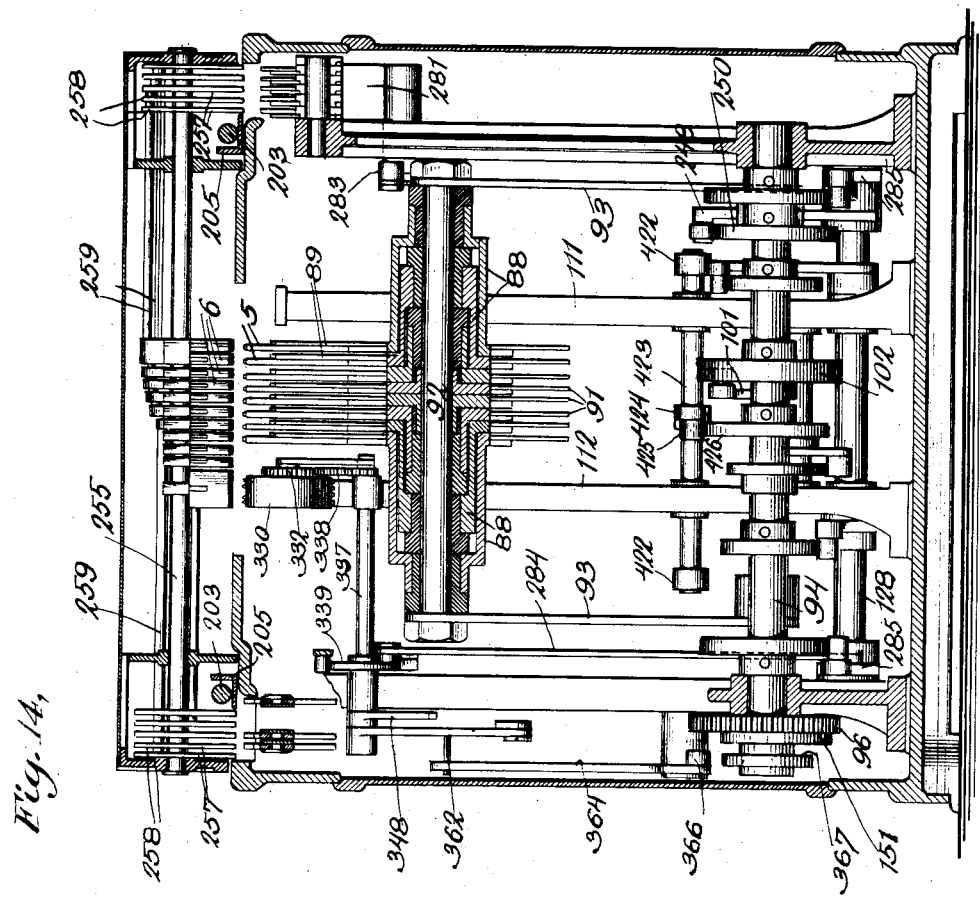
Figure 15:
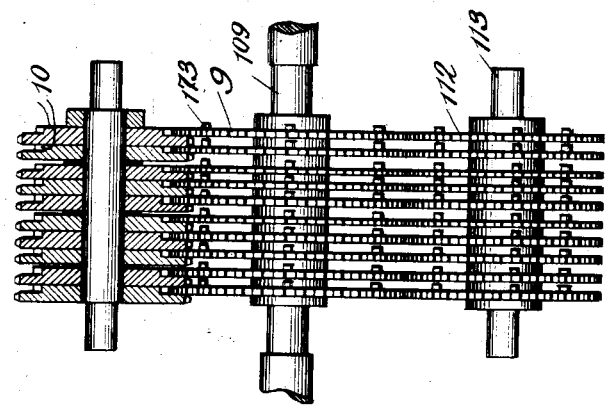

Referring now to the drawings of such form of machine, Figure 1 is a side view of such machine; Fig. 2, a plan; Fig. 3, a plan of the interior with the top plate and the keyboard-sections removed; Fig. 4, a vertical longitudinal section on the lines 4 4 of Fig. 3; Fig. 5, a similar section on the lines 5 5 of Fig. 3. Fig. 6 is a central longitudinal section on the lines 6 6 of Fig. 3; Fig. 7, a longitudinal section on the lines 7 7 of Fig. 3. Fig. 8 is a side elevation of the mechanism looking in the same direction as in Fig. 7, taken on lines 8 8 of Fig. 3. Fig. 9 is a rear view of a portion of the inside of the machine, showing a rear view of the carriage. Fig. 10 is a detail connected with the hammer-trip mechanism of the name-wheel. Fig. 11 is a cross-section of the machine, showing a front view of the individual type-segments and their connections and also showing a front view of the carriage, taken on the lines 11 11 of Fig. 6. Figs. 12 and 13 are detail views of the name-wheel and its plate. Fig. 14 is a vertical cross-section on the lines 14 14 of Fig. 6, giving a section of the individual type-segments and their mountings and an elevation of the main cam-shaft of the machine with its cams and levers. Fig. 15 is a detail front view of the adding-wheels and the total-type wheels, the latter being in section. Fig. 16 is a horizontal section of the carriage, taken just above the hammers, showing the carriage removed from the machine, but mounted upon a portion of the slide-rods. Fig. 17 is a rear view of the crossover-rods and connections. Fig. 18 is a side elevation of one of the key-section units or series of keys. Fig. 19 is a cross-section on the lines 19 19 of Fig. 18. Fig. 20 is a horizontal section of the key mechanism, taken on the lines 20 20 of Fig. 18, intended merely to show how the shanks of the keys are held by the retaining-bar. Fig. 21 is a perspective view of an individual type-segment. Fig. 22 is a horizontal section on the lines 22 22 of Fig. 6, showing a part of the carrying mechanism. Fig. 23 is a front view of the front inking-ribbon mechanism. Fig. 24 is a side view of the same. Figs. 25 to 28 are detail views of the counter, Fig. 25 being a bottom view partially in section; Fig. 26, a cross-section on the lines 26 26 of Fig. 25. Fig. 29 is a diagrammatic or skeleton view showing the position of one series of devices in the position they assume when the "8" key has been depressed and the machine operated by means of its main handle. Fig. 30 is a detail showing the action of one of the hammers. Fig. 31 is an opposite view of the rear of the machine, showing the mounting for a paper-roll. Fig. 32 is a top view of said roll and its mounting removed from the machine. Fig. 33 is a view of a slip which has been printed on the machine. Fig. 34 is a view of the duplex paper preferably used in connection with the machine. Figs. 35 and 36 are details of the clearing-signal and its operative parts. Figs. 37 and 38 and 39 are details of the carrying mechanism, showing successive positions of the parts in the operation of the machine. Fig. 40 is a rear view of the same. Fig. 41 is a detail of the hammer-trip of the name-plate.

Before proceeding to describe in detail the various parts of the machine I will briefly state how the machine is operated. The operator first depresses such of the keys as represent the number he wishes to print or add upon the machine. The keys depressed are locked in their down position and the operation of any key a series of locks in their up position all the other keys of the same series, preventing the depression of more than one key in the same series. He then pulls forward handle 2, secured to a reciprocating rod 3, as far as it will come and then pushes it backward or permits it to return to its backward or normal position. This moves such of the type-segments 4 as correspond to the series of keys in which keys have been depressed a distance corresponding to the value of the respective keys that have been depressed, bringing the one of a series of type 5 carried by the type-segment corresponding to the value of the corresponding key depressed upon the printing-line underneath one of a series of hammers 6 and also adding the same number upon a series of total-adding wheels 7 by means of a gear 8, mounted on a type-segment 4 and through an intermediate series of adding-wheels 9, meshing with gears 10, secured to total-adding wheels 7. The movement of handle 2 also causes such of the hammers 6 as are tripped in a manner to be hereinafter described to print the numbers set upon the printing-line upon any suitable record-strip, such as the strip of paper 11. The operation of the handle 2 also returns all of the parts to their original or normal positions. The operation of the handle also feeds the paper strip and an inking-ribbon. The result of the operation is to print upon the strip the number represented by the keys depressed and to add the same number upon the total-adding wheels. If the operator desires to print a total at any time, he pushes the carriage 12, which contains the hammers and some other parts of the printing mechanism, backward along the top of the machine until the hammers 6 are over the top of the total-adding wheels 7. This operation effects the printing of the total upon the paper strip, leaving a space between the total and the items of the account above it, as shown in Fig. 33. On the return of the carriage to its normal position the paper is fed to leave a space between said total and the items of the next account. The operator can at any time by moving a reset-handle 13 reset the adding-wheels at zero.

I will now proceed to describe in detail the different parts of the machine.

*The driving mechanism.*—This is more particularly illustrated in Figs. 1 to 8, inclusive. In the driving mechanism of my machine I provide a driving member adapted to rotate in one direction only, which, as shown, is the main driving-shaft 14, a reciprocating member for imparting motion to the driving member, as shown, a rock-shaft 15, to which a reciprocating handle 2 is secured, and I provide connections between the two shafts for transferring the rocking movement of one into the continuous rotation of the other. These connections are so arranged and adapted that the movement of the handle 2 in one direction will cause the main driving-shaft 14 to be rotated a different amount from that imparted to it by the movement of said handle in the opposite direction. I prefer to arrange the parts so that the forward or initial movement of the handle 2 will rotate shaft 14 the greater distance and in the arrangement shown in the drawings that forward movement will rotate shaft 14 two-thirds of a complete revolution, while the return movement of handle 2 to its original position will rotate the shaft the remaining one-third of a complete revolution. The connections shown for this purpose are as follows: 16 is a plate fast to shaft 15. 17 is a plate loosely mounted on the shaft. Slidingly mounted on plate 17 is a slide-plate 18, having an extension 19 movable between studs 20 of plate 17. Slide-plate 18 is capable of a sliding movement on plate 17. This sliding plate is provided with two reversely-acting sets of gearing 21 and 22. These sets of gearing are arranged at different radial distances from the center of the rock-shaft 15 and when operative are concentric therewith, one gearing 21 facing outward from the center, the other facing inward. These gears 21 and 22 are so arranged that if the sliding plate is in its outward radial position gear 21 will mesh with a gear-wheel 23 and gear 22 will be out of mesh, while if the sliding plate is in its inward radial position gear 22 will mesh with the opposite side of gear-wheel 23 and gear 21 will be out of mesh. Means are provided for throwing one of these sets of gears into mesh with gear-wheel 23 when the rock-shaft rotates one way and the other into mesh when it rotates the other way. In sliding plate 18 there is a cam-slot 24, in which works roller 25, attached to plate 16. The upper part of plate 16 has a tooth 26. Mounted on plate 17 is a pawl 27, which has an extension 28 at the right and an extension 29 at the left. The cam-surfaces on these extensions are adapted in the different positions of the parts to strike pins 30, mounted on the side frame of the machine. Mounted on plate 17 are two pins 31 31, and coacting with these pins, but mounted on the side frame, are two pawls 32 32, which are spring-actuated and have limiting stop-pins 33 33. Pawl 27 has a pin 34, coacting with pin 26 of plate 16. The operation of these devices is as follows: In the position shown in Fig. 4, which is the normal position before the operation of the machine, pawl 27 is against pin 30 and tooth 34 is raised out of engagement with tooth 26. Pawl 32 engages pin 31. Gear 21 is in mesh with gear-wheel 23, while gear 22 is out of mesh. The forward movement of handle 2 will cause roller 25 on plate 16 to move forward. The slope of the cam-slot 24 is such that this first movement of the handle will move sliding plate 18 inwardly, taking gear 21 out of mesh with gear 23 and putting gear 22 into mesh with it on its opposite side. The slight further movement of the handle will cause extensions 28 of pawl 27 to free its upper pin 30, and the tooth 34 will drop out of behind tooth 26. Before this takes place plate 16 will have moved forward or to the right a sufficient distance to bring the tooth 34 back of tooth 26. By this time roller 25 will have reached the forward end of slot 24. In this position of the parts roller 25 in slot 24 on one side of pins 26 and 34 will rigidly and positively lock plates 16 and 17, so that forward movement of plate 16 will cause the movement of plate 17 and its connections the same as if the parts formed one rigid structure. This rigidity is essential for the accurate and reliable working of the machine. Further forward movement of the handle will cause gear-wheel 23 to rotate in the direction of the arrow, which will rotate gear 35 in the direction of its arrow, rotating main driving-shaft 14 in the same direction. When handle 2 has reached its forward position, pin 31 locks into pawl 32, the end 29 of pawl 27 rides up against pin 30 and frees plate 16 from plate 17, preparing the parts for the return movement. When handle 2 begins its backward movement, plate 16 being free from plate 17, roller 25 moves to the opposite or rear end of slot 24, throwing gear 22 out of mesh with gear-wheel 23 and gear 31 into mesh and freeing pin 31 from pawl 32, permitting the return of plate 17 and its connections, while the movement of the parts to the rear frees extension 29 from pin 30 and permits pin 34 to drop downward. By this time pin 26 has moved to the rear of pin 34 and the latter drops down in front of pin 36. Plates 16 and 17 are again rigidly locked together by means of roller 25 and slot 24 and pins 26 and 34, and plate 17 is carried backward by the movement of plate 16. Attached to plate 16 is a spring 36, anchored to the side frame of the machine. The purpose of this spring is to return the parts to their original or normal positions in case the operator lets go of the handle while on its return or does not push it back far enough. Spring 36 is so proportioned that it will bring the parts back to their original position in such a case. As the parts reach their original positions pawl 32 again locks with pin 31, locking plate 17 and its connections in their original positions, and extension 28 on pawl 27 contacts with pin 30, lifting tooth 34 out of engagement with tooth 36, preparing the parts for the next operation of the machine.

The reversely-acting gears facing in opposite directions and operating upon different sides of the gear-wheel 23 when successively in engagement with it rotate that gear and with it the main driving-shaft always in the same direction. The arrangement of these gears 21 and 22 at different distances from the center of the rock-shaft enables the main driving-shaft to be rotated a greater distance when the handle 2 is moved in one direction than in the other. As shown in the machine, these parts are so proportioned that on the forward or initial movement of handle 2 shaft 14 is rotated two-thirds of a complete revolution and one-third of a revolution on the return of handle 2 to its original position. One advantage of this arrangement is that practically the entire work performed by the machine is accomplished by the forward pull of the handle 2. In the machine shown no work is performed on the return of the handle except to return to their original positions a few of the parts of the machine. Through such an arrangement the return-spring 36 can be made comparatively very light. Where this spring is made strong, as it must be where a considerable part of the work is done on the return of the handle, spring 36 must be made very heavy, thus increasing the amount of work to be done by a person in operating the machine. In practice it has been found that the ordinary operator will not push a reciprocating handle backward at least to its full limit or with the force with which he will pull it forward and that most operators will let the handle go at some point during the return. For these reasons a return-spring is essential for practical use. This arrangement, moreover, enables the machine to be made very rapid, accurate, and positive in operation.

In order that gear 21 may pass in front of gear-wheel 35, gear-wheel 23 is made of double width, so that gears 21 and 22 mesh with the front half of it, while gear 35 meshes with its rear half, as shown in Fig. 3.

*Keyboard mechanism.*—This is specially illustrated in Figs. 2, 3, 18, 19, and 20. The keyboard consists, as shown, of a bank of keys 1 1, consisting of eight series, each having nine keys. The keys 1 are mounted in grooves in a casing 37, having one casing for each series of keys, which casing and its series of keys and connections form one of the keyboard units. The casings 37 are mounted on rods 38 38, which pass through openings 39 39 of the casings. The shaft of each key extends to and is flush with a portion of the casing 37, which is concentric with main driving shaft 14. Each key has a spring 40 to hold it in its upper position and which carries a roller 41, which being in contact with the surface 42 of the casing 37 acts as an operative stop to hold the key in position. The shanks of the keys are held in their slots by the bars 43, to which springs 40 are secured. The back of each key-section casing 37 is recessed at 44 in order to give room for the bar 43 of the next section or unit. Running behind the keys and in contact with the rollers 41 of the key-shanks is the universal bar 45, mounted upon links 46 and 47, pivoted at the keyboard-casing at 48. This universal bar 45 is normally held in its upper position by means of a spring 49, attached to the bar and to the frame. Bar 45 carries a series of pins 50, one for each key-shank, each pin being capable of engaging with one or the other of two notches 51 52 in the key-shank, according to the vertical position of the key-shank. Link 47 has a tooth 53, which coacts with pawl 54, mounted on the casing 37. 55 is the preliminary or zero stop and is controlled by an arm 56, which is operated by a pin 57 on universal bar 45.

The operation of the parts is as follows: When any key of a series is depressed, the roller 41 forces the universal bar 45 of that series downward. As this bar is mounted on two parallel links the whole bar swings downwardly, but always maintains a position parallel to its original one. This causes pins 50 to enter notches 52 in the shank of all the keys except that of the key which has been depressed. In the case of that key its pin 50 enters notch 51. The keys are all thus locked in position, the depressed key in its down position, the other keys in their upward position. Pawl 54 engages with tooth 53 of link 47 and holds bar 45 in its downward position. The swinging movement of universal bar 45 to the right rocks the arm 56 and lifts the preliminary stop 55 out of its operative position, or, in other words, brings it flush with the lower concentric surfaces of casing 37. The toe of the key that has been depressed projects downwardly beyond its concentric portion and acts as a stop, in the manner presently to be described, of the mechanism for rotating one of the type-segments 4.

Preliminary stops 55 in their normal position prevent the movement of the type-segments should handle 2 be operated before any keys are depressed. Each pawl 54 is provided with a tail 58 for unlocking the universal bar and permitting the parts to return to their normal position. This operation automatically by the machine will be presently described. It will be noted that the shank of No. 9 key does not project down to the concentric portion of casing 37. The stop-operated part for this key is a stationary plate 59, secured to the casing 37. Otherwise key 9 is like the other keys.

In my above improved keyboard mechanism a single universal bar operates directly to lock the keys in their down or up positions and to unlock them and to control directly the operations of the preliminary or zero stop. By my improved arrangement the keyboard mechanism of machines of the character described herein are very much simplified and the number of parts reduced. The locking and unlocking of the keys by the universal bar is accomplished by means of a single engaging portion on one of these parts and two engaging portions on the other. In the form shown the one engaging part is the pin 50 on the universal bar 45, while the two engaging portions on the keys are the notches 51 52. This enables the same devices to lock and unlock all of the keys, both those that are down and those that are up.

*The setting mechanism for the type-segments.*—This is more particularly illustrated in Figs. 3, 4, 5, 6, 7, 18, 21, and 29. The object of the setting mechanism is to transmit motion from the main driving-shaft 14 to the numeral-bearing devices, the type-segments 4, and from them to the adding-wheels and to return these parts to their normal positions. Separate setting devices are provided for each series of keys, and the movement of each set is controlled by the keys of the series. Each key when depressed throws a stop into the path of its setting device, which stop limits the movement of the setting device in accordance with the value of the key depressed. As the movement of the type-segments and their connecting parts is a reciprocating movement and that of shaft 14 a continuous rotary movement, each setting device is provided with a part fast on the shaft and a part loose upon it, and a locking-piece is provided to normally lock the fast and loose parts together; but each lock is thrown out of operative position when it engages a key-stop. This throws the loose part from the fast part, the former being locked in the position to which it has been moved. With the loose part are connected the corresponding type-segments and connecting parts. The main driving-shaft continues its rotation, and in the course of the operation of the machine the loose parts are unlocked and returned to their original positions. In the form of these devices shown in the drawings there are loosely mounted on shaft 14 a series of bell-crank levers 60. At one end of each of these levers is mounted a locking-dog 61, which has projecting lug 62. Lug 62 has a rectangular projection (shown in Fig. 3) adapted to coact with a surface 63 of a lever 64, fast on shaft 14. The other end 65 of a lever 64 forms a counterbalance portion. In the lever 64 is a slot 66. 67 is a spring secured to a vertically-extending portion 68 of dog 61 and normally holds the dog in the position shown in Fig. 6, with surfaces 62 and 63 in contact. Portion 68 has a projection 69, extending at right angles to it, adapted to be engaged with notches 70 of a locking-plate 71, secured to casing 37. 72 is a stop-pin for limiting the movement of dog 61.

When shaft 14 is rotated, lever 64 forms contact with surfaces 63 and 62, pushes bell-crank lever 60, to which locking-dog 61 is secured, ahead with it, thus rotating bell-crank lever 60. This movement of the latter continues until the nose of locking-dog 61 engages either the preliminary or zero stop 55 or lower end of the shank of any key that has been depressed, which shank in that case acts as a stop. This contact slightly rotates dog 61 on its pivot, moves pawl 62 away from contact with surface 63 of pawl 64 and brings it opposite slot 66 in lever 64, permitting lever 64 to continue its rotation with shaft 14, but preventing higher rotation of bell-crank lever 60. The slight rotation of dog 61 also throws rectangular portion 69 into one of the notches 70 of locking-plate 71, thus positively locking bell-crank lever 60 and its connections in a fixed or rigid position. In a machine of the character shown and described herein, in which the parts must necessarily have great rigidity of movement, this positive locking is of great importance. It permits the rapid operation of the machine and at the same time insures absolute accuracy and certainty in operation. It will be understood that after shaft 14 is revolved and any key of a series has been depressed that the preliminary stop 55 will perform the function of rotating dog 61.

The means shown for returning the levers 60 to their original position consists of the following: Attached to each bell-crank lever 60 is a link 73, pivoted to a plate 74, having a downwardly-projecting tooth 75. Plate 74 is loosely mounted on shaft 76. Fixedly mounted on shaft 76 are two arms 77, carrying a universal bar 78, adapted to coact with the teeth 75 of the different plates 74. On the outside of the machine, (see Fig. 7,) mounted on main shaft 14, is a cam 79, which acts on the cam-roller 80 of a bell-crank lever 81, pivoted at 82 to the framework, the roller 80 being held against the cam by means of spring 83. Attached to this bell-crank lever 81 is a link 85, fixed to shaft 76. These parts stand normally in the position shown in Fig. 7. Immediately upon the beginning of rotation of shaft 14 (in the direction of the arrow in Fig. 7) roller 80 will drop down to cam-surface 79, carrying universal bar 78 away from teeth 75, thus leaving bell-crank lever 60 in a position free to rotate. Later on in the rotation of shaft 14 cam 79 will begin gradually to move roller 80 upward, and thus gradually to swing universal bar 78 slowly to the right, as viewed in Fig. 6. During this movement it will collect the teeth 75 and move them gradually to the right to their original positions, as shown in Fig. 6, thus returning bell-crank levers 60 to their original positions. By this time the levers 64, fast on shaft 14, have completed one revolution and the parts will occupy the positions shown in Figs. 6 and 7 ready for the next operation.

*The type-segments and connecting parts.—*
These are specially illustrated in Figs. 6, 11, 14, 21, and 29. Each type-segment 4 is connected to one of the rock-levers 60 through a link 86, pivotally connected with arm 87, which forms a portion of the type-segments. These type-segments may be made of any suitable form. As shown they are made with a body 88, forming a part of a cylinder, and a segment 89, carrying type 5 and ratchet-teeth 90, and a segment 91, having gearing 8, meshing with intermediate adding-wheels 9, as already described. The different type-segments are arranged with their cylindrical portions nested together in the well-known manner. By this arrangement the arms 87 can be brought opposite the different bell-crank levers 60, while the type-segments can be arranged close together, so as to be capable of printing a column of figures of the character shown in Fig. 33. The type-segments are preferably arranged so that the zero-type will normally be slightly off the printing-line, as shown, slightly in advance of that line, and the segment will then be moved to bring the zero to the printing-line and will then be moved to bring upon the printing-line the type represented by the key depressed. I also mount the type-segments movably, so that they can be swung in a curved path to mesh with the adding-wheels. In the form shown in the drawings the type-segments 4 are mounted on the main shaft 92, which shaft is carried by arms 93 93, pinioned to a rock-shaft 94. To the rear of main driving-shaft 14 is a cam-shaft 95, which is driven by main driving-shaft 14 through gear 96 on the latter shaft, (see Fig. 7,) through intermediate gear 97, and gear 98 on shaft 95, so that the latter shaft rotates in the same direction and in unison with driving-shaft 14. Mounted on shaft 95 is a race-cam 99, in which runs a cam-roller 100, mounted on arm 101, rigidly secured to rock-shaft 94. Cam 99 consists of an upraised portion 102 and a long portion 103. Coacting with ratchet 90 are a series of pawls 104, pivoted on a stud 105 and having a downwardly-extending portion 106, which normally rests against a key or feather 107, mortised into a shaft 108. The operation of these parts is as follows: When the machine is at rest, the parts occupy the position shown at Fig. 6. On the first start of the machine shaft 108 is rotated slightly by means to be hereinafter described, so as to free the depending portions 106 of the pawls, permitting the pawls 104 to drop into engagement with the ratchet-teeth 90. Just before this happens portion 102 of race-cam 99 raises roller 100, rocking shaft 94 and rocking arms 93. This rocking movement is sufficient to carry shaft 92 and the individual segments slightly to the right as viewed in Fig. 6, so that the zero or first numeral on each type-segment will be upon the printing-line or in line with the hammers. When this position is reached, the pawls 104 drop into the first tooth of ratchet 90, holding the type-segments momentarily in this position of alinement. A further movement of the main driving-shaft moves the rock-levers 60 until they are stopped either by the preliminary stops 55 or the depressed shanks of the keys. This movement of the rock-levers 60 is communicated to the type-segments, which type-segments are moved the distance corresponding to the value of the key that has been depressed in its series, bringing the proper type upon the printing-line. Fig. 29 illustrates the position of the parts taken in such operation when the "8" key has been depressed and the main driving-shaft has been rotated far enough to bring dog 61 of its series into engagement with the depressed shank of key 8. This swinging movement of the type-segments to the right and slightly downward enables the teeth of gear 8 to mesh with the gear-teeth of wheel 9 always with certainty and accuracy and without any binding of the teeth. This is assisted by commencing the upward rotation of the type-segment just at or slightly before the intermeshing of the two gears. The movements of gear-teeth at that moment is a combined one and more effectually insures against any binding of the teeth of the two gears.

*Adding mechanism.*—This is more particularly illustrated in Figs. 5 to 8, 22, 29, 37, and 40. The intermediate adding-wheels 9 are loosely mounted on a shaft 109, mounted in the sub side frames 110 and 111 of the machine, and are restrained by pawls 318, secured to the framework. Each wheel 9 is provided with forty teeth, and each gear 10, with which it meshes, is provided with twenty teeth. Below the adding-wheels 9 are a set of carrying-wheels 112, loosely mounted on the shaft 113, supported in the sub side frames. Each carrying-wheel 112 has thirty teeth and is provided with three carrying-pins 114, spaced one hundred and twenty degrees apart. These coact with the carrying set-up levers, which levers carry the carrying-pawls 116. Each set-up lever 115 has a rearwardly-extending portion 117, which coacts with locking-levers 118. Set-up levers 115 are loosely mounted on a stud 119, and locking-levers 118 are loosely mounted on stud 120. Carrying-pawls 116 are loosely pivoted to a downwardly-extending portion 121 of set-up levers 115 and are normally held with the left-hand portion upward through spring 122. Carrying-pawls 116 have a rear portion provided with a right-angled portion 123, which are adapted at all times to coact with one of a series of pins 124, mounted in a spiral fast on circular plates 125, secured to rock-shaft 126. 127 is a plate mounted on rock-shaft 128, there being one of these plates for each carrying-wheel. Each plate 127 has a carrying-rack 139, mounted upon its plate by means of studs 130 130, secured to plate 127, passing through slots 131 in the carrying-rack, each rack being held normally in its upward position by means of a spring 132, secured to the plate and rack. Carrying-rack 139 is provided at its upper end with teeth 133, which at times mesh with the teeth of carrying-wheels 112. Rack 139 is provided with a lip 134, with which the toe of its corresponding carrying-pawl 116 is at times adapted to engage. Mounted on a rock-shaft 135 are two arms 136, which carry a universal bar 137, which on rotation of rock-shaft 135 comes against the upper surface 138 of locking-levers 118. Upon shaft 120 are mounted two plates 139, which extend downwardly and at their lower ends 140 are grooved to conform to the surface of the disks 125. Extending between the two plates 139 is a fixed stud 141, which coacts at times with a rearwardly-extending arm 142 of lock-levers 118. A spring 143 normally holds lock-levers 118 in the position shown in Fig. 6. A spring 144 normally holds each set-up lever 115 in the position shown in Fig. 6.

The operation of the adding and carrying mechanism is as follows: The movement of gear 8 is imparted, through intermediate adding-wheels 9 and gear 10, to total-adding wheels 7, adding on each operation of the machine to the total already standing upon those wheels the number that is set up on the printing-line. The intermediate adding-wheels 9 also rotate the carrying-wheels 112 a similar number of teeth. As soon as this addition takes place cam-roller 100 runs off the high portion of cam 102 and the type-segments are moved out of engagement with adding-wheels 9. When carrying-wheel 112 has been moved nine units, one of the pins 114 is immediately next and to the left of the toe of set-up lever 115. Upon the next movement of wheel 112 pin 114 will rotate lever 115 slightly to the right. This rotation will move the right-angled portion 145 on the right end of lever 115 from the position it occupies in Fig. 37, which is the normal position, into the position shown in Fig. 38. In the former position the right-angled portion 145 lies against surface 146 of lock-lever 118, but in the position to which it is moved it lies against the surface 147 slightly cut away, thus locking lever 115 in its retracted position. 148 is a lip on lock-lever 118 to prevent lever 115 from overthrowing. The parts of my improved machine operate so rapidly that the momentum of levers 115 would be apt to throw the end 147 over the lower part of lever 118 if it were not for this lip 148. Should such an overthrowing occur, it would block the machine and render it inoperative. Lip 148 also aids in the return movement of the parts to insure the quick return of lever 115 to its original position. If desired, lip 148 can be continued upward still farther or be joined with the projecting portion of lock-lever 118, lying just above it, so that there will be no opening upon which the right-hand end of 115 can possibly be thrown. The position of lever 115 and its connecting parts immediately after the above carrying operation is shown in Fig. 29. The rotation of set-up lever 115 moves the carrying-pawl 116 to the left and upward, bringing its toe over lip 134 of carrying-rack 139 and also bringing the right-angled projection 123 into line with the pins 124 of the spiral. Immediately after this has taken place a cam 149 (see Fig. 5) on cam-shaft 95 acts on the cam-roller by a lever 150, which is fast on shaft 128, and rocks this sufficiently to throw plates 127 and carrying-racks 139 to the right, bringing teeth 133 into mesh with the wheels 112. This brings lip 134 under the left-hand end of pawl 116. It will be understood that this lip 134 extends laterally, so that the pawl 116 with which it engages will be the pawl of the next lower numerical order. The adding-helix in the continued operation of the machine are rotated so that the pins 124 will engage with right-angled portions 123 of such of the pawls 116 as have been moved in the position shown in Fig. 38. This will rotate pawl 116 on its pivot and through lip 134 will force rack 139 downward, moving carrying-wheel 112 of the next higher order one unit. Where, however, a pawl 116 has not been thus set, but is in its normal position, (shown in Fig. 37,) the pin of this spiral will pass inside of the projection 123 and will not affect pawl 116 in any way.

The carrying-helices are rotated by means of the following devices: Mounted upon cam-shaft 95, Fig. 7, is a cam 151, which acts on the cam-roller 152, mounted upon lever 153, pivoted to the framework at 154. Pivoted to lever 153 is a link 155, pivoted at its other end to an arm 156, mounted upon rock-shaft 157. A spring 158 normally holds arm 156 in its rearward position. Referring now to Fig. 8, it will be seen that shaft 157, which extends inwardly and has its inner end mounted in the side frame 110, carries a segment 159, which in turn meshes with a pinion 160, secured to adding-helix shaft 126. Shaft 126 is thus rotated through an arc sufficient to cause adding spiral pins 124 to pass successively by their corresponding carrying-pawls. 161 is a binding-pin which fastens or holds adding spiral plates together. At the last moment of rotation, just before cam 151 has ceased to act, this binding-pin comes into contact with the end 162 of plates 139. This moves plates 139 to the rear sufficiently to lift bar 141 against portions 142 of the locking-levers 118, rocking those levers to the left, so as to unlock the carrying-levers 115. This returns the various parts of this operation of the mechanism to their normal and original positions. The pins 124 of the spiral on their return movement pass by projections 123 without touching them.

In order to insure the accurate return of the carrying-plates to their normal or original positions in case the springs do not operate properly, I preferably employ means for positively returning them to such position. The devices shown for this purpose are as follows: 440 is a bar extending under the entire set of carrying-racks. It is supported on an arm 441, pivoted at 442 under the keys and carrying at its other end a cam-roller 443, operated by a cam 444 on cam-shaft 95. Away at the end of the operation of the machine this cam positively pushes up the racks to release them instantaneously upon the starting of the machine.

*Resetting mechanism.*—This is specially illustrated in Figs. 6, 7, and 8. 13 is a reset-handle for the purpose of resetting the adding-wheels whenever desired. The arm 163, to which this handle is connected, is secured to a short shaft 164, Figs. 2 and 7. On this shaft is mounted a rocking arm 165. Pivoted to this is a link 166, pivoted to an arm 167, the latter mounted upon rock-shaft 135. Pivoted to a universal bar 168, extending from between the two arms 136, are a series of reset-levers 169, one for each of the adding-wheels 9. Each reset-lever has a cam-slot 170, through which passes a stationary stud 171, fixed in the subframes 110 and 111. Each reset-lever 169 has a toe 172. On each adding-wheel 9 are a series of pins 173, spaced ten teeth apart. The toes 172 of the reset-levers are normally out of the path of pins 173. When the reset-handle is turned by means of the connections above described, the reset-levers are thrown to the left and the cam-slot 170 and the fixed stud 171 cause the toes 172 to be moved up into the path of rotation of the pins 173 and to be then moved circumferentially along that path to the left, as shown in Fig. 6. In this movement the toes 172 pick up the pins 173 and move wheels 9 until the pins 173 are in the position occupied by them when the wheel is in its normal or zero position. This movement also moves the total-adding wheels back to their zero position and brings the pins 114 on carrying-wheels 112 back to their original zero positions. The cam-slot 170 is so shaped that the first movement of toe 172 is substantially a vertical one, while the second movement carries the toe in a curved path concentric with shaft 109. This operation collects the pins 173 in whatever position they may be and returns them to the zero position.

After reset-handle 13 has been pulled forward to reset the adding mechanism it and its connecting parts are returned to their original positions by means of a spring 174, secured to arm 165. The forward movement of arm 136 has carried forward the universal bar 137, bringing it into contact with the upper portion 138 of the locking-levers 118, pushing them forward and releasing the carrying-levers 115 in the same manner that the bar 141 released them. This operation returns the carrying mechanism to its original position. The stud 175, Fig. 9, acts as a binding-stud for the two arms 136.

*Interlock between the main handle and the reset-handle.*—This is more particularly shown in Figs. 8 and 35. It has been found important in practice to interlock the main handle with the reset-handle, so that only one of them can be operated at a time. When one has been started, the other will be locked until the first one has completed its work. This may be accomplished in any desired manner. The devices shown in the drawings for this purpose are as follows: Mounted upon the main handle-shaft 15 is a segmental plate 176, and upon the reset-handle shaft 164 is mounted a corresponding plate 177. The direction of rotation of the shafts 15 and 164 is indicated by the arrows in Fig. 8. Referring now to Fig. 35, in which these two plates are shown in section, together with the arrows indicating the direction of movement, there is mounted upon the base of the machine a bracket 178, which forms the inner bearing for the shaft 164. Passing from the other part of the bracket is a cylindrical opening 179, in which is loosely mounted a hard-steel stud 180. Each of the plates 176 and 177 has in it a depression 181 adapted to receive the rounded end of stud 180. The length of stud 180 is such that it occupies the entire opening 179 and one of the cup-like depressions 181. These cup-like depressions are made slightly cam shape. If either plate 176 or 177 is revolved slightly in the direction of its arrow, this cup will force the steel stud 180 out of the cup and into engagement with the other cup, locking the plate of the latter. This locking will remain effective until the handle connected with the locking-plate has completed its full movement. It will thus be seen that the interlocking mechanism is under the control of both the main handle and the resetting-handle and is thrown into operation by the handle that first starts its movement.

*Release and repeat keys.*—These are, specially illustrated on Figs. 3, 4, 6, 7, and 18. The release-key is provided in case an error should be made in depressing the keys to permit the keys to be returned to their normal positions without operating the machine. A repeat-key is also provided to permit the same number to be printed and added successively a plurality of times without again depressing the keys. The mechanism for these purposes shown in the drawings consists of the following: 182 is a wheel fast on shaft 14 at the extreme left of the machine. This wheel is provided with a cam 183, having a cut-away portion, as shown near the top in Fig. 6. 184 is a pin mounted in the side of wheel 182. On a rock-shaft 185, which extends between the side frames of the machine, is mounted a universal bar 186, carried by the side arms 187, Fig. 3. Also mounted upon its rock-shaft 185 is a lever 188, held normally in the position shown in Fig. 6 by means of a coil-spring 189, Fig. 3, coiled around shaft 185 and having one end extending under universal bar 186. This arm 188 has a right-angular-extended portion 190. This is cam-shaped, and upon it acts pin 184. Upon the right-hand end of shaft 185 is mounted an arm 191, which coacts with a pin 192, mounted upon the shank of repeat-key 193. A spring 194 holds this key normally in its upward position. The arm 188 has an extended portion 195, which coacts with the pin 196, Fig. 7, mounted on the shank of the release-key 197. This release-key is held in a normal upright position by spring 198. It will be noted by reference to Fig. 6 that the universal bar 186 lies contiguous to the pawls 58 of the keyboard mechanism. Upon the arm 188 is mounted a pin 199, Fig. 3, which extends over and coacts with the arm 187.

The operation of the above mechanism is as follows: One or more keys having been depressed, the universal bars of the series containing the keys depressed are locked in their down position and the tails 58 corresponding therewith occupy their rear position. If it is desired to release the keys that have been depressed, pin 199 forces arm 187 downward and rocking universal bar 186 downward and forward against the pawls 58 of the keys that have been depressed. This will unlock the universal bars from their connections, permitting them and their connections to return to their normal positions. This release of the universal bars through their tails 58 is also accomplished at the end of each operation of the machine by pin 184 striking against the rear end of arm 188 and moving pin 199, rocking universal bar 186 downward and to the left in the same manner. If, however, it be desired to print or add the same number a second or any successive number of times, this can be done without again depressing the same keys. In that case the repeat-key 193 is depressed, and as long as it remains down and the main operating-handle is turned the same number will be printed upon the recording-strip and will be added upon the adding-wheels. The depressing of key 193 brings shoulder 200 of its shank under pin 201, Fig. 4, in which position the repeat-key is held by spring 194 and locked in its down position, where it will remain until the operator releases it by pulling the key slightly forward to disengage shoulder 200 from pin 201. The depression of repeat-key 193 causes pin 192 to press upon arm 191 of rock-shaft 185, rocking the shaft in such a direction that the cam portion 190 of arm 188 is depressed, so that pin 184 on wheel 182 will pass entirely over it without striking it. The main driving-handle can therefore be operated without releasing the keyboard mechanism.

It is found important to prevent the release of the keys that have been depressed by the operation of the release-key after the main operating-handle has started in its movement. In order to accomplish this, the wheel 182 is provided with the rim 183. This rim prevents the raising of arm 188, with its accompanying cam 190, by means of pressure upon the release-key 197, and the consequent release of the keyboard mechanism. The only position in which the release-key can be operated is when the machine is at rest, with the opening in the rim 183 at the top of the wheel in the position shown in Figs. 3 and 6.

*Printing mechanism.*—This is specially illustrated in Figs. 1, 2, 4, 5, 6, 9, and 16. Mounted on the top plate of the machine are sliding rods 203 203, Fig. 2, fixed in bosses, upon which rods the carriage 12 is mounted. This carriage has two sliding plates 205, adapted to slide upon rods 203, upon which is hinged the housing of the hammer mechanism. These two plates are attached at the forward end by the rods 206, which pass through links 207 and are held in position by screws 208. At both the right and left of the machine and hinged to the plates 205 are side housings 209, which include the part of the hammer-operating mechanism which goes into contact with the hammer-trips, as will be explained hereinafter. In the forward part of the carriage is mounted a shaft 210, carrying the main feed-roller 211. On this shaft, but inside of the right-hand side housing, is a spur-gear 212 and a ratchet-wheel 213. In the right-hand housing above shaft 210 is a short shaft 214, Fig. 4, carrying a gear 215, meshing with gear 212. Shaft 214 has upon its upper or right-hand end outside of the casing, a knurled wheel 216, Figs. 1 and 2.

Referring now to Fig. 6, mounted in the arms 217, pivoted at 218 and between the side housing, is another feed-roll 219. This roll is held normally in contact with main feed-roll 211 by means of spring 220. The forward end of arms 217 rest upon a rock-shaft 221, which extends between and through the two housings and has upon its right-hand end, outside of the casing, a thumb-piece 222, Figs. 1 and 2, coacting with the forward end of arms 217, and in shaft 221 is a pin 223, extending outward from both sides of shaft 221. At the rear of the carriage, underneath the hinged rod 224, is a roller 225, which is held up into position against the hinged rod 224 by means of a spring 226, mounted on a block 227, adapted to hinge-rod 224.

Referring to Fig. 16, it will be seen that on one side of each of the blocks 227 is a coiled spring 228, encircling rod 224, secured at one end to block 227 and passing at its other end under one of the side housings at the point 229. These springs exert an upward pressure upon the carriage and when permitted will raise the forward end of the carriage into the position shown in Fig. 5. Mounted on the inside of each of the right and left hand housings at the forward end is a small pawl 230, Fig. 6, which pawl is pivotally mounted on the carriage at 231 and held in normal locking position by the spring 232. The lower end of pawl 230 engages a pin 233, fixed to the stationary bar 206. The upper end of pawl 230 coacts with the other end of pin 223, which projects to the left through bar 221 and has a portion 234 for limiting the rotation of rock-shaft 221.

Mounted between the two side housings is an intermediate paper-guide roll 235, which is idle and serves merely to hold the paper down against the type-plate. It will be noted that if the knurled wheel 216 be turned the lower feed-roll will be driven by the gearing 214 and 212 in either direction, also that the pressure in one direction on the thumb-piece 222 will serve to separate the feed-rolls by releasing roll 219, so as to permit the paper to be passed through between them, whereas motion of the thumb-piece in the other direction will cause pin 223 to act on the cam-locked surface of pawl 230, forcing it forward and releasing the pawl from engagement with pin 233, whereupon springs 228 will cause the carriage to rise into the position shown in Fig. 5. On restoring the carriage to its normal position pawl 230 will act as a lock and hold it in its downward position.

Mounted upon the inside of the right-hand housing is a pawl-carrying plate 236, pivoted at 237 in the framework of the carriage This plate carries a pawl 238 on its forward end, which acts upon ratchet-wheel 213 to rotate shaft 210 and feed forward the paper. The rear end of plate 236 has two parts, one a downwardly-projecting portion 239, which portion has its lower surface flush with the lower surface of the carriage, and a portion 240, which has two cam-surfaces 241 capable of coacting with pin 242, affixed to the typeplate.

Pivoted to the right-hand main side frame of the machine at the point 243 is an operating-plate 244, which extends through an opening of the side frame and then upwardly until it is flush with the type-surface at the point 245, where it is directly in line with the downwardly-extending portion 239 of the plate 236. At the lower end of the operating-plate 244 and pivoted at 246 is a connecting-link 247, extending downwardly and attached to an arm 248, bearing a cam-roller 249, bearing against a cam 250, mounted upon the main cam-shaft 95.

It will be seen that when cam 250 comes into operative position it will raise the arm 248 and link 247 and will push up the surface 245 into contact with surface 239, thus locking plate 236 upon its pivot and causing pawl 238 to move in a downward direction and through gear 212 to rotate shaft 210 and main feed-roll 211, thus feeding forward the predetermined amount of paper. This feed takes place at the very beginning of the operation of the machine and is practically the first thing that happens.

Normally the paper used is a short paper and is pushed through the guide-rolls at the rear of the carriage and underneath the free roll 235, under the hammers, around the lower feed-roll, and up in between the two rolls, as shown by the dotted lines in Fig. 6. If desired, the paper may be passed after going from the feed-rolls underneath a shoulder-piece of metal 251, which may be used as a stationary knife in order to tear off the amount of paper needed. If preferred, a roll of paper may be used, and in Figs. 31 and 32 a roll 252 is shown mounted in brackets 253. From the roll the paper passes through the machine as already described.

Preferably I use individual hammers for the different type-segments. These are shown in Fig. 16. In the machine shown in the drawings eleven hammers are required, the two right-hand hammers, as viewed in Fig. 16, being for the cents, and these are preferably secured together and operated as one. The extreme left-hand hammer (shown in Fig. 16) is for the name-wheel and, as shown, is preferably made wider than the others. The hammers are operated through the main driving mechanism of the machine by means of trips, these trips engaging with projecting portions or toes connected with the hammers. In my preferred form the trips of all of the hammers are always operative; but only those trips which engage with the hammer-toes which are moved into operative position through the operation of a key of the corresponding series of keys. I will now proceed to describe this mechanism.

Situated inside the right-hand housing of the carriage are the five lower projecting portions or toes connected with the hammers, and in the left-hand housing the four upper hammer-toes and that of the name-wheel are arranged. The cents are always printed together, and the two cents hammers are therefore operated together and mounted in a common operating-block 254. This operating-block, together with the other operating-blocks to which the hammer-handles are secured, is pivotally mounted upon stationary shaft 255, which shaft extends across the machine through the side housing, being held in position by screws 256. Each hammer and hammer-block is arranged with a projection or toe 257, adapted to be tripped to operate the hammer in a manner presently to be described. These toes form the lower part of rocking piece 258, each loosely mounted on shaft 255 and each mounted to its hammer-block by a crossover-rod 259. Five of these toes 257 are arranged in the right-hand housing and five in the left, as shown in Fig. 16. The crossover-rods are arranged as shown in that figure, the cents one connecting with the piece 258 at the left in the right-hand housing, the dollar with the next piece 258 to the right, and so on, the crossover-rod 259 of the name-plate hammer communicating with the right-hand piece 258 in the left-hand housing, the block 254 of the higher-numeral hammer with the piece 258 next to the left, and so on. These crossover-rods are for convenience arranged in a spiral manner, as shown in Fig. 6. Each piece 258 has a spring 260 for holding it in normal position, the springs being attached to a spring-bar 261, Fig. 4. This spring-bar consists of a small frame 262, mounted upon a shaft 263, which shaft extends across through the housing. It will be understood that there are two such spring-bars, one on each side of the machine. Each spring-bar has connected with it a handle 264 to move the spring-bar into various positions.

265 represents notches in the covering 266 of the carriage, Fig. 2. These notches are made by cutting an opening 267 in the top covering, leaving the prongs 268. These cuts form a resting-place for handle 264. Any number of notches may be provided. By varying the position of the handle 264 in the notches the tension of the springs 260 can be regulated.

The hammer-toes 257 project downward to a point nearly flush with the depressed surface of the top plate, as shown in Fig. 4. In an opening 269 in the top plate project upward a series of trips 267, projecting upward from sliding trip-plates 271. These trip-plates and the trips are adapted to have a reciprocating forward and backward movement. Each trip-plate is mounted upon a tilting plate 272, pivotally mounted upon a stud 273, secured to the side frames. Each plate has a cam-slot 274 at its forward end, in which rides a pin 275, secured to a plate 276, pivoted on a stud 277. Each tilting plate 272 has slots 278, in which work pins 279, secured to trip-plate 271, allowing a sliding motion of the trip-plate upon the tilting plate. The lower part of trip-plate 271 is bifurcated to allow the head 280 of operating-lever 281 to rise between the two projecting parts of the trip-plate to give a forward and backward movement to the trip-plate. Lever 281 is pivoted on a small shaft 282, which on the side of the side frame has mounted on it an operating-arm 283. Connected to arm 283 is a link 284, pivoted at the bottom to a lever 285, the lever being provided with a cam-roller 286, bearing against a cam 287. It will be seen that the action of cam 287 when it becomes operative is to depress lever 285 and through the above connections rock lever 281 to the left to move trip-plate 271 in a horizontal direction along its slots. In the normal operation of these parts all of the trip-plates 271 are reciprocated forward and backward at every operation of the machine. It will be noted that normally—that is, when no key of the corresponding series has been depressed—trip 270 of the trip-plate is too low down to engage with its corresponding toe 257. If a key in the series, however, is depressed, it will operate to rock set-plate 276 to the left or forward and will tilt the rear end of tilting plate 272 upward, raising toe 267 of trip 271 high enough to engage with its corresponding toe 257. In this position of the parts the forward travel of trip-plate 271 and trip 267 will force toe 257 to the left, rocking plate 258 and through each crossover-rod raising the hammer upward. When trip 267 passes toe 257, the hammer will be brought down to deliver the printing-blow. The handle of each hammer is preferably pivoted at 288. Secured to projecting potions of each is a compressed spring 289, which normally holds the hammer upward in the position shown in Fig. 6. The object of this is to provide for the rebound. Fig. 30 illustrates the position of the hammer and its toe and the trip-plate and tilting plate in the act of printing. The full lines represent the position of the parts immediately before contact is made between the trip and the toe and the dotted lines the position of the parts at the moment when the trip is about to snap under from the toe. The operating-head 280 of lever 281 is wide and extends through the entire set of trip-plates.

The means by which the depressed key rocks setting-plate 276 to the left will now be described as embodied in the form shown in the drawings. These are particularly illustrated in Figs. 3, 4, 6, 11, and 17. Each setting-plate 276 is held by a spring 290, normally locked to the rear, as shown in Fig. 4.

On reference to Fig. 6 it will be noted that each arm 87 carries a sidewardly-extending roller 291. Each of these rollers coacts with an extension 292, connected with a plate 293, pivotally supported on a fixed stud 294. Each plate 293 is arranged alongside of its corresponding arm 87. Each plate 293 is connected with its corresponding setting-plate 276 by means of a crossover-rod 295 in the same manner as the hammer-blocks are connected to the plates 258, and the crossovers are arranged spirally in the same manner and for the same purpose. Fig. 17 gives a rear view of these crossover-rods. 296 represents pins projecting each from the face of one of the setting-plates 276 across the face of the plate of the next lower numerical order. The object of this is so that the movement of the setting-plate of a higher order will move all of the setting-plates of lower orders in the operative position, so that the depressing of a key of any order will not only cause its own hammer to be operated, but the hammers of all lower orders also to be operated. The crossover-rods 295 (shown at the bottom of Fig. 17) are shown as having at 297 an overlapping joint. The rod 295 at the right of that figure, which is a rod running from the lowest numerical setting-plate of the high side of the machine, overlaps the other rod 295, which is connected with the highest numerical setting-plate on the low side of the machine for the purpose just described. Each extension 292 has a cut-away or depressed portion 298, Fig. 6.

The operation of the above parts is as follows: At the time that the pawls 104 have dropped into the first notch of the ratchets 90 of type-segments 4 each roller 291 has swung the corresponding extension 292 slightly to the right and has entered the cut-away portion or depression 298. If a key of the corresponding series has been depressed, the arm 87 rocks still further, and in that case its pin 291 moves extension 292 slightly to the right and moves down the curved outer surface 299 on extension 292. Extension 292 and its outward curve 299 are so arranged that in this position of the parts the further downward and rearward movement of roller 291 will follow the line of the curve 299, that now being concentric with shaft 92, so that no further movement will be imparted to plates 293 and their corresponding setting-plates 276. Such further contact with roller 291 with extension 292 simply serves to hold plates 276 in their set position; but the rearward movement of extension 292 imparted to it when roller 291 passes out from cut-away portion 298 upon surfaces 299 is sufficient to rotate plates 293 and setting-plate 276 enough to tilt plates 272, as above described. In this manner the depression of a key in any series sets its trip 267 into operative position ready for the actuation of its printing-hammer upon the operation of the main operating-handle, and it also sets the trips of all hammers of lower numerical orders.

Immediately in the rear of the front hammer-trips are a set of hammer-trips for actuating the hammers to print the total on the adding-wheels. For convenience these trips will be spoken of as the "total" hammer-trips. There is of course one of these total hammer-trips 300 for each wheel 7 of the adding series. In the form of machine shown in the drawings, where there are only eight type-segments, only eight trips 267 are required; but two extra adding-wheels are used and accordingly two extra hammer-trips 300 are required, or, in other words, ten trips. Each hammer-trip 300 is pivoted at 301 to a tilting plate 304 and is provided with a spring 302 to hold it against the stop 303 on the plate 304. The plates 304 are pivoted to a stud 305, secured to the framework, and provided with a slot 306, in which runs a pin 307, attached to a setting-up plate 308, pivoted at 309 with a stud secured to the framework. Each total-trip is slightly depressed below the printing-level exactly like trip 267 and projects upward into an opening 310 in the top plate at the rear of the machine. A rocking forward motion of plate 308 will raise trip 300 into operative position ready to engage its corresponding toe 257 and cause the operation of its hammer when the carriage is pushed backward to the rear of the machine. A total can be taken at any time by pressing the carriage backward along the side rods 203. The purpose of the two cam parts 241 of the plate 236 is to make one of the surfaces 241 of the plate 236 ride up on stationary pin 242, affixed to the type-plate, and the purpose of the other surface 241 to ride up on the same pin 242 on the forward motion of the carriage, so that on both the rear and forward movement of the carriage the paper will be fed and a space left above and below the total as printed on the paper. Preferably the total is printed in a colored ink to distinguish it from the different items. The spaces above and below the total are illustrated in Fig. 33.

Plates 308 are set up, as shown in the drawings, by means of the following devices: Mounted upon a shaft 311 near the rear of the machine are a series of bell-crank levers 312. Pivoted to each is a link 313, which in turn is pivotally attached to a plate 314. Each plate 314 has a crossover-rod 315 connecting it with corresponding setting-up plate 308. These crossover-rods are arranged spirally in the same manner as the crossover-rods of the set-up plates 276. A rear view of these crossovers will be found in Fig. 9. One arm of the bell-crank lever 312 has a nose 316. These parts are frictionally held and will set in whatever position they are moved to. The nose 316 is adapted to coact with pins 173 of adding-wheels 9. When wheels 9 are at their zero position, one pin 173 is immediately above and in contact with nose 316. The first movement of the adding-wheels 9 from "0" to "1" causes the pin 173 to rock nose 316 of lever 312 slightly to the right, Fig. 6. This movement is sufficient to rock set-up plate 308 sufficiently to the left, Fig. 4, to raise trip 300 into operative position.

The positions of pins 173 on wheels 9, as shown in Fig. 6, is not the zero position, but represents some position to which the wheels have been moved after amounts have been added on the machine. It will be seen from the above that the initial movement from "0" to "1" of any of the adding-wheels 9 will set its corresponding hammer-trip where it will remain in such position until the adding-wheels are reset at zero. These trips and their connecting parts are returned to normal position, when the resetting-handle is turned by means of a universal bar 175, mounted on two arms 319, fast on shaft 168, striking against the lower end of bell-crank lever 312, moving toes 316 back into operative position and restoring all of the connecting mechanism to their original positions.

*Clearing-signal.*—This is specially illustrated in Figs. 4 and 36. It has been found advisable in practice to have a signal to indicate the condition of the machine—that is, whether it is in the zero or non-operated condition or whether numbers have been printed and added. For this purpose I provide a signal, which I will speak of as the "clearing-signal." As shown, it consists of a curved plate 320, pivotally mounted on a stud 321 and opposite an opening 322 in the front casing of the machine. On this signal appear the words "Clear" and "Not clear." When the word "Clear" stands opposite the opening, it means that the machine has not been operated, but stands in the zero position. This signal is mounted immediately in front of the cents setting-plate 276. No matter what the first amount is that is set up, the cents-hammer-setting plate 276 always moves in order to print at least the zeros of the cents-column. In this rocking forward movement the cents-plate 276 plays against an arm 323, connected with the segment carrying the clearing-signal. This rocks the plate downward, bringing the words "Not clear" opposite the opening of the machine. The signal is positively held in any position to which it is moved by means of a pin 324 on an arm depending from and forming part of the plate-bearing segment and a notched spring 325, provided with two notches, Fig. 4. When the machine is reset at zero, the signal is restored to its clear position by means of a link 326, pivoted to a bell-crank lever 327, mounted in the rear of the machine. Upon the shaft 135 of the resetting mechanism already described is mounted just opposite of the right-hand subframe 111 a disk 328, which carries a pin 329. In the return of the resetting-shaft this pin restores the clearing-signal to its clear position.

*Name-wheel and its operating mechanism.*—These are particularly illustrated in Figs. 2, 3, 7, 10, 12, 13, 14, and 33. 330, Fig. 3, is a wheel for printing names such as "Note," "Check," &c. (See Fig. 33.) As shown, this is arranged at the left of the type-segments. Of course any suitable words may be arranged in type upon this wheel. This name-wheel is mounted on a removable block 331, Fig. 13, and has mounted upon its hub a spur-gear 332, Figs. 13 and 14. The removable block 331 has two slots 333 cut in it for mounting it upon a pair of studs 334, Fig. 3, fixed to the left-hand subframe 110. This plate 331 also carries a downwardly-projecting portion 335, having a circular cut 336 in its lower end to straddle a shaft 337, Fig. 14. This shaft carries on its inner end a quadrant 338, which gears with spur-gear 332. The shaft 337 is mounted in bosses in the subframe 110 and in the left-hand outer main frame. Just inside of the main frame is a cam 339. Referring now to Fig. 10, pivoted on the side frame is an arm 340, carrying a roller 341 and terminating in a portion having a slot 342. The set-up plate for the name-hammer is situated next the side frame on the left-hand side and consists of the plate 343, Fig. 10, having an upper portion 344, which carries a pin 345. This pin is in the slot of the tilting plate of the name-hammer in the same manner as the pins of the front set-up plates 276 are in the slot 274 of the tilting plates 272. It also has a rectangular projecting portion 346, which carries a pin 347, which passes from an opening in the side frame into the slot 342 of the arm 340. At the upper end of the shaft 337 is mounted a toothed segment 348, Fig. 7. This segment has a tooth or indentation for each name on the name-wheel. Attached to the bosses 349 on the main frame is an impositive spring-lock 350, which coacts with the teeth of the segment 345. Also mounted upon shaft 337 is a depending arm 351, to which is attached a connecting-link 352, attached at its other end to a boss on sliding carriage 353. This carriage is mounted and slidable upon a rod 354, fixed in bosses 355 of one of the casings forming a part of the keyboard-section of the machine. This sliding carriage 353 carries attached to its upper side a handle 356, which is provided with a pointer 357, Fig. 2. The sliding carriage 353 carries the pin 358, adapted to coact with a stop-pawl 359, having an upwardly-projecting handle 360. This pawl is normally held in operative position by a spring 361. Arm 351 carries a pin 362, which acts in a slot 363 in an arm 364, pivoted at 365 on the left-hand side frame. This arm or lever 364 carries at its lower end a roller 366, controlled by cam 367, on cam-shaft 95. The action of these parts is as follows: In its normal position the arm 360 is tilted slightly forward, with the front part of its pawl portion 359 in or out of engagement with pin 358, and sliding carriage 353 is then at its rearmost position. In this position the roller 341 on arm 340 is in its deepest depression, Fig. 10, and the hammer-trip of the name-wheel is in its downward position, and the name-wheel stands blank. If it is desired to print any one of the series of names opposite to an amount which is to be printed, the operator takes hold of the handle 356 and pulls it forward until pointer 357 is opposite the word it is desired to print. The impositive lock 350 centers the total-segment 348 sufficiently so that it occupies a predetermined position, and the gear-segment 338 turns gear 332, to which is affixed the name type-wheel, turning the name-wheel to a position corresponding with the name opposite the pointer 357. The succeeding operation of the machine causes cam 367 to act on roller 366 and lever 364. This cam is so proportioned that it will not turn lever 364 sufficiently far to throw the name type-wheel back to "Blank," but takes it back until it stands at "Ditto." At this point the pin 358 abuts against the forward portion of pawl 359, which acts as a stop, and the carriage and the other parts are held in the position shown in Fig. 7. As long as handle 356 is not operated the machine will continue to print "Ditto" for any further operation of the name-wheel. If the operator then desires to return the parts to zero, he takes hold of handles 356 and 360 between his thumb and finger and presses them together. This will cause pawl 259 to rock slightly forward, releasing pin 358, when the pressure will cause the carriage to move slightly backward to its rearmost position. This movement returns the main type-wheel to "Blank."

When the name-plate mechanism is standing at "Ditto" and it is desired to print a total on the total-adding wheels, it is necessary to provide means to permit the toe of the name-hammer, if a total has been taken and when the parts are on their forward movement, to pass the name-hammer trip. For this purpose I arrange the name-hammer trip somewhat differently from the other trips, as shown in Fig. 41. As there shown the tilting plate 445 carries a trip sliding plate 446, upon which is mounted the trip proper, 447, pivoted upon stud or pin 448 of sliding plate 446 and provided with a spring 449. Upon 448 is one passing through the slot 450 of the tilting plate. On pushing the carriage backward to take a total, trip 447 trips the name-hammer; but no impression is made, as the hammer is then beyond the inking-ribbon. If the total is taken, the parts are pulled forward and the toe connected with the name-hammer strikes on the inclined surface of pawl 447 and forces pawl 447 downward against spring 449 out of its way. This is also true where a ditto is reprinted.

*The counter and its mechanism.*—These are specially illustrated in Figs. 1, 2, 4, 25, and 28. It has been found desirable in practice in adding the amounts of checks or any other series of papers involving numbers to be added that a record should be automatically kept by the machine of the number of operations or manipulations. For example, when the operator has added up the amounts taken from fifty checks, say, the machine should have an indicator which should stand at "50." At the right-hand upper portion of the keyboard are shown the dials 368 of such a counter. This counter is shown in details in Figs. 25, 26, and 27. This mechanism consists of a shaft 369, having a knurled wheel 370 outside of the casing of the machine. Mounted on this shaft are three wheels 371, 372, and 373. The wheel 373 carries a ratchet 374 and alongside of it a ten-toothed gear-wheel 375. The second wheel 372 carries a ten-toothed gear 376, and wheel 371 a ten-toothed gear 377. Immediately in the rear of shaft 369 is a stationary shaft 378, which is mounted in the side plates 379 380, which form the frame of the counter. Mounted upon shaft 378 is a sleeve 381, which carries a ten-toothed gear 382 and a one-toothed gear 383. Mounted and in mesh with gear 376 is a similar sleeve 384, which has a one-toothed portion 385. Mounted upon shaft 378 is a pawl-carrying plate 386, having a spring-pressed pawl 387 mounted upon it and which coacts with the ratchet-wheel 374. This pawl-carrying plate has a depending portion 388, which is acted upon by each operation of the driving mechanism by a pin 389, Fig. 4, mounted on plate 17. The forward motion of the driving mechanism causes pin 389 to strike pin 388 to communicate with the next lower tooth of ratchet-wheel 374, and thus feed that ratchet-wheel one step forward. After wheel 374 has been turned its full complement and at the time when it goes from "9" to "0" the one-toothed portion of sleeve 381, which has meanwhile been turning step by step, acts upon gear 376 of wheel 372, moving it forward one step. When these two wheels have reached "99," the one-toothed portion 385 of sleeve 384 acts upon gear 377 of wheel 371, moving it one step forward. Each one of the wheels carries recessed within it a pawl 390, Fig. 28. Each pawl is normally pressed toward shaft 369 by spring 391. Shaft 369 has a slot at 392. It will be seen that each operation of the machine will cause the numeral-wheels to add "1," so that the counter will always show the number of operations or additions that have been made, providing that the counter is set at zero at the same time that the main machine is reset. The counter may be set at zero by taking hold of knurled wheel 370 and revolving it in a direction such that the tooth or slot 393 on shaft 369 will pick up the pawls 390 of the numeral-wheel in whatever position they may chance to be. In this way the wheels may be moved back to zero. Immediately in the rear of the counter and on the outside of the casing is a knurled wheel 393, which controls an eccentric 394, Fig. 4, mounted on the shaft 395 of the knurled wheel. The eccentric being turned throws the lower portion 388 sufficiently far forward so that the pin 389 will miss it. In this way by turning knurled wheel 393 the counting apparatus may be thrown out of operation whenever it is found desirable not to use it.

*The printing-paper.*—This is illustrated specially in Figs. 31, 32, and 34. Any suitable recording-strip may be employed. This may be in the form of a single strip of paper or in the form of a roll, as shown in Figs. 31 and 32. I refer, however, to the paper which is capable of manifolding or printing in duplicate or triplicate. While it is of course possible to use carbons in connection with two or more strips of paper, it has been found desirable to use what is known as "duplex" paper. This is shown in Fig. 34 and consists of a highly-calendered paper 396, which has upon the back of it at 397 a carbon surface sufficient to give one clean copy. Next to this is a paper 398, more or less absorbent in character, but hard enough to give a clean copy. These two papers may be used together, either in separate rolls or secured together in any manner, as by folding. When it is intended to use this duplex paper or any system of manifolding, the handles 264 of the carriage should be put in their uppermost notch 265, bringing the springs 260 under greater tension, and thereby increasing the force of the blow of the hammers in order to give a clear manifold impression.

It will be noted that the force of the blow of the hammers might also be regulated by varying the height to which the trips are raised. This is taken advantage of in the printing done by the name-plate. It has been found in practice that the ditto-marks being so small and sharp are apt under the force of the normal printing-blow used in the machine to perforate the paper. In Fig. 10 it will be noticed that the cam 339 has a small depression 399, in which the roller 341 of arm 340 rests when the name-wheel is in the ditto position. This position is shown in Figs. 7 and 10. In this position the trip of the name-plate is raised sufficiently to trip the name-wheel hammer, but is not raised as high as the other trips are normally raised or as high as the trip of the name-hammer is raised for printing the other names on the name-wheel.

The result is that the hammer does not give as powerful a blow when the ditto-marks are printed.

*Rear ink-ribbon.*—This is specially illustrated in Figs. 2, 3, and 5. Referring to Fig. 3, it will be noticed that at the rear are the rear ink-ribbon rolls 400. These rolls are mounted in the casings 401, which casings form bridges between the subframes and the outside main frames. These rolls are preferably arranged so that the line of feed of the ink-ribbon will be at an angle to the line of the type. The rolls can be removed from their supports by taking off the knurled thumb-piece 402, and the ribbon can be fed by means of the knurled thumb-piece 403 on the outside of the rear of the machine. 404 represents idle rollers over which the ink-ribbon passes, which carry the ribbon up above the type and in close relation to the steel plate 405, Fig. 2, which is let into the top plate of the machine and which carries the opening 406, through which the hammers act upon the paper and rear ink-ribbon against the type of the total-adding wheels.

*Front-ink-ribbon feed.*—This is specially illustrated in Figs. 3, 5, 6, 14, 23, and 24. The front ink-ribbon extends across and over the individual type-segments and the name-wheel in about the same relation that the rear ink-ribbon occupies with the total type-wheels. 407 represents the two rollers upon which this ink-ribbon is wound. One roll is mounted in a casing 408, which forms a bridge between the upper left-hand frame and the inner left-hand subframe 110. The other roll is mounted in a casing 409, which bridges between the inner right-hand subframe 111 and the outer right-hand main frame. Referring to Fig. 23, it will be seen that upon the casing 408 are mounted three guide-rolls 410, 411, and 412. The type-ribbon 413 passes from roll 407 over roll 410, under 411, over 412, then over the type-segments, and around similar rolls 412, 411, and 410 on the other side of the machine to the other roll 407. Upon the shaft 414, upon which the left-hand roll 407 is mounted, there is secured a ratchet-wheel 415, by means of which the ribbon is fed in one direction. There is a similar ratchet-wheel 415 mounted upon the shaft 414 of the other roll. Mounted upon a stud 416 is a stop-pawl 417, which at times engages with ratchet-wheel 415. This pawl carries a counterbalance portion 418, which coacts with a pin 419, mounted upon a pawl-carrying plate 420. The inner upper portion of this plate carries a pawl 421, which pawl acts to feed the ratchet-wheel when in operative position. It will be understood that these parts are duplicate on each half of the inking-ribbon-feeding mechanism. The lower end of pawl-carrying plate 420 is attached to a rock-arm 422, Fig. 5, which serves to actuate it. Rock-arm 422 is mounted upon a rock-shaft 423. This shaft carries in the center of the machine an arm 424, Fig. 6, carrying a cam-roller 425, bearing upon cam 426 on cam-shaft 95. Referring to Fig. 14, it will be seen that shaft 423 carries an actuating-arm 422 at each end, one for each portion of the inking-ribbon-feed mechanism. Mounted upon a depending portion at the forward part of each of the plates 408 and 409 is a lever 427, which carries at its upper end two laterally-extending pins 428, between which the ink-ribbon passes. The lower parts of these levers 427 are connected by a rod 429. Secured to both parts of plate 420 is a connecting-rod 430, which, as shown, is bent downward in order that it may pass freely between the operative parts of the machine. This rod 430 has an enlarged portion 431, which has a rectangular opening 432. Attached to stud 433, upon which the right-hand portion of lever 427 is loosely secured, is also mounted a depending lever 434, which carries a loosely-mounted roll 435 and on its lower end a roll 436. A pin 451 on lever 427 enters a hole in lever 434. Preferably the pin fits loosely in the hole. Motion is thus communicated from 427 to 434. This roll 436 extends through the opening 432 of connecting-link 430. The ink-ribbon carries near each end secured to it a rivet or button 437. (Shown at the left end of Fig. 23.) This button is so large that it is incapable of being drawn through the space between the two pins 428. The loosely-mounted roll 435 coacts with one or the other of two notches 438 in an impositive lock-spring 439, mounted upon the framework of the machine. The operation of the various parts is as follows: Referring particularly to Fig. 23, as there shown pawl 421 of the right-hand unit is in operative position with its ratchet-wheel 415 and stop-pawl 416 is also in engagement with the ratchet-wheel. In this position of the parts the loosely-mounted roller 435 occupies the right-hand notch 438 of spring 439 and the roll 436 is in the right-hand corner of the rectangular opening 432. In this position of the parts the ink-ribbon is being fed toward the right as viewed in Fig. 23. The pressure of roll 436 in the right-hand corner of the opening 432 is sufficient to keep feed-pawl 421 in operative connection with its ratchet-wheel and at the same time to hold the left-hand pawl 421 out of engagement with its ratchet-wheel. Pin 419 of the left-hand unit is pressing against the counterweight 418 of left-hand locking-pawl 417 and has revolved it sufficiently to throw it out of engagement with its ratchet-wheel. When through the oscillations of shaft 423 the pawl-carrying plate 420 has been vibrated frictionally a sufficient number of times to feed the ink-ribbon to the right sufficiently far, button 437 will strike against pins 428 and being unable to pass through between them it will push the pins to the right and revolve levers 427 about their center. This pressure continues until it is sufficient to cause the loosely-mounted roll 435 to move slightly upon the projecting portion of the right-hand notch 438. During this movement roll 436 has moved freely in slot 432. This slot is made rectangular in order to allow for the vertical vibration of the connecting-link 420 and the sidewise movement of roll 436 at once. When lever 427 has moved sufficiently to the left, the roll 435 snaps suddenly out from the right-hand notch into the left-hand notch. This operation takes place very suddenly, owing to the fact that the roll 435 is loosely mounted. This causes roll 436 to suddenly strike the left-hand end of opening 432 a sharp blow sufficiently strong to give a sudden tip toward the left of the pawl-carrying plates 420 and to throw the left-hand pawl 421 and stop-pawl 417 into engagement with their ratchet-wheel and to free the corresponding parts on the other side of the feeding mechanism. The continued oscillation of shaft 423 will then cause the ribbon to move in a reverse direction.

It is very important in ink-ribbon-feeding mechanism that is automatically reversible to have the reversal take place as suddenly as possible. The reason for this is that the power is derived from the ribbon itself and unless the reversal of the parts is sudden the power derived from the ink-ribbon is apt to cease before the reversal of the parts is completed. By my improved device the reversal takes place practically instantaneously, and there is little liability of the feed mechanism becoming inoperative.

Certain parts of the main driving mechanism of the machine shown herein connected with the reciprocating handle and the main driving-handle and their connections are not my invention, but are the invention of one Harry T. Goss, similarly also the devices shown herein for resetting the adding-wheels at zero are not my invention, but are the invention of one Frank Rath.

Certain parts of my improved devices shown in the machine herein, which are peculiarly applicable to the printing part of the mechanism, are not claimed in this application, as they form the subject-matter of another application of mine executed simultaneously herewith and to be filed simultaneously herewith.

Many modifications from and changes in the form of apparatus shown in the drawings may, of course, be made without departing from my invention, the essentials of which are set forth in the claims appended hereto.

Certain parts of the machine shown in the accompanying drawings and described herein and which are my invention are not claimed herein, as they are claimed in another application of mine executed and to be filed simultaneously herewith.

What I claim as new, and desire to secure by Letters Patent, is—

1. The combination of a set of adding-wheels, gearing for each wheel, a set of type-bearing members each provided with a gear for driving its corresponding adding-wheel, a shaft upon which the type-bearing members rotate movably supported and adapted to be swung in a curved path to bring the driving-gear into mesh with the adding-gearing and to bring the zero-type upon the printing-line.

2. The combination of a set of adding-wheels, gearing for each wheel, a set of type-bearing members each provided with a gear for driving its corresponding adding-wheel, a shaft upon which the type-bearing members rotate movably supported and adapted to be swung in a curved path to bring the driving-gear into mesh with the adding-gearing and to bring the zero-type upon the printing-line, means for rotating the driving-gear and means for swinging the shaft, the rotating and swinging means being so arranged and adapted as to bring the zero-type upon the printing-line and to cause the driving-gear to mesh with the numeral-wheel gearing as the driving-gear begins its rotation.

3. In an adding-machine the combination of a set of adding-wheels, a set of hammers, one for each adding-wheel, a trip for each hammer normally out of operative alinement with its hammer, connections between each adding-wheel and its trip, adapted to set the trip in operative alinement upon the first movement of the adding-wheel from its zero position.

4. In an adding-machine the combination of an adding-wheel, a hammer therefor, a trip for operating the hammer normally out of operative alinement with the hammer, connections between the adding-wheel and trip adapted to set the trip in operative alinement upon the first movement of the adding-wheel from its zero position.

5. In an adding-machine the combination of a set of adding-wheels, a set of hammers, one for each adding-wheel, a trip for each hammer normally out of operative alinement with its hammer, connections between each adding-wheel and its trip adapted to set the trip in operative alinement upon the first movement of the adding-wheel from its zero position, and means for resetting the trips in their original positions.

6. In an adding-machine the combination of an adding-wheel, a hammer therefor, a trip for operating the hammer normally out of operative alinement with the hammer, connections between the adding-wheel and trip adapted to set the trip in operative alinement upon the first movement of the adding-wheel from its zero position and means for resetting the trip in its original position.

7. In an adding-machine the combination of a set of adding-wheels, a set of hammers, one for each adding-wheel, a frictionally-movable trip for each hammer normally out of operative alinement with its hammer, connections between each adding-wheel and its trip, adapted to set the trip in operative alinement upon the first movement of the adding-wheel from its zero position, and means for resetting the trips in their original positions.

8. In an adding-machine the combination of a set of adding-wheels, means for adding upon said wheels, a carrying member for carrying from a wheel of lower order to a wheel of higher order, out of operative connection with the wheel of higher order during the operation of adding upon the adding-wheels, means for throwing it into operative connection with such wheel at the close of such adding operation, and means, controlled by the adding-wheel of lower order, for operating the carrying member to cause it to carry to the wheel of higher order, when the wheel of lower order has moved its full order.

9. In an adding-machine the combination of a set of adding-wheels, means for adding upon said wheels, a carrying member for carrying from a wheel of lower order to a wheel of higher order, out of operative connection with the wheel of higher order during the operation of adding upon the adding-wheels, means for throwing it into operative connection with such wheel at the close of such adding operation, driving mechanism for operating the carrying member, a connection between the driving mechanism and the carrying member, controlled by the adding-wheel of a lower order and normally out of operative position, but adapted to be moved into operative position to connect the driving mechanism with the carrying member when the said adding-wheel of lower order has moved its full order, whereby the carrying mechanism will be out of engagement with the adding-wheels during the adding operation, and will then be moved into engagement to perform the carrying operation.

10. In an adding-machine the combination of a set of adding-wheels, means for adding upon said wheels, carrying members each for carrying from a wheel of lower order to a wheel of higher order, out of operative connection with the wheel of higher order during the operation of adding upon the adding-wheels, means for throwing the carrying members into operative connection with their respective wheels at the close of such adding operation, driving mechanism for operating the carrying members, a connection between the driving mechanism and each carrying member, controlled by the adding-wheel of a lower order and normally disconnected from the driving mechanism, but adapted to be operatively connected therewith when the said adding-wheel of lower order has moved its full order, whereby the carrying members will be out of operative connection with the adding-wheels during the adding operation, and will then be moved into operative connection to perform the carrying operation, and whereby the driving mechanism and each carrying member will be operatively connected only when the corresponding wheel of lower order has moved its full order.

11. In an adding-machine the combination of a set of adding-wheels, means for adding upon said wheels, a carrying member for carrying from a wheel of lower order to a wheel of higher order, out of operative connection with the wheel of higher order during the operation of adding upon the adding-wheels, means for throwing it into operative connection with such wheel at the close of such adding operation, driving mechanism for operating the carrying member, a connection between the driving mechanism and the carrying member, controlled by the adding-wheel of a lower order and normally disconnected from the carrying member, but adapted to be connected therewith when the said adding-wheel of lower order has moved its full order, whereby the carrying mechanism will be out of operative connection with the adding-wheels during the adding operation, and will then be moved into operative connection to perform the carrying operation, and whereby the driving mechanism and the carrying member will be operatively connected only when the wheel of lower order has moved its full order.

12. In an adding-machine the combination of a set of adding-wheels, means for adding upon the said wheels, a series of carrying members for carrying from a lower to a higher order, driving devices for the carrying members arranged to operate successively upon the different carrying members, whereby the carrying will be done successively upon the different adding-wheels.

13. In an adding-machine the combination of a set of adding-wheels, means for adding upon the said wheels, a series of carrying members for carrying from a lower to a higher order, driving devices for the carrying members, a connection between each driving device and its carrying member normally out of operative connection with one of said parts but adapted to be thrown into operative connection therewith by the adding-wheel of a lower order when it has moved its full order, whereby only those carrying members will be operatively connected with their operating devices for carrying purposes whose corresponding wheels of lower orders have moved their full order.

14. In an adding-machine the combination of a set of adding-wheels, means for adding upon the said wheels, a series of carrying members for carrying from a lower to a higher order, driving devices for the carrying members, a connection between each driving device and its carrying member normally out of operative connection with both of said parts but adapted to be thrown into operative connection therewith by the adding-wheels of a lower order when it has moved its full order, whereby only those carrying members will be operatively connected with their driving devices for carrying purposes whose corresponding wheels of lower orders have moved their full order.

15. In an adding-machine the combination of a set of adding-wheels, means for adding upon said wheels, a series of carrying members for carrying from a lower to a higher order, driving devices for the carrying members arranged spirally and adapted to operate successively upon the different carrying members, whereby the carrying will be done successively upon the different adding-wheels.

16. In an adding-machine the combination of a set of adding-wheels, means for adding upon the said wheels, a series of carrying members for carrying from a lower to a higher order, driving devices for the carrying members spirally arranged, a connection between each driving device and its carrying member normally out of operative position between said parts but adapted to be thrown into operative position by the adding-wheel of a lower order when it has moved its full order, whereby only those carrying members will be operated whose connections with their respective driving devices have been thrown into operative position and whereby such carrying members will be operated successively.

17. In an adding-machine the combination of a set of adding-wheels, means for adding upon the said wheels, a series of carrying members for carrying from a lower to a higher order normally out of operative connection with their respective wheels of higher orders, means for throwing the carrying members into operative connection with the wheels of higher orders at the close of the adding operation, driving devices for the carrying members spirally arranged, a connection between each driving device and its carrying member normally out of operative position between said parts but adapted to be thrown into operative position by the adding-wheel of a lower order when it has moved its full order, whereby the carrying members will be thrown into operative connection with their respective wheels of higher order at the close of each adding operation, but only those carrying members will be operated to carry to said higher wheels whose connection with their respective driving devices have been thrown into operative position, and such carrying members will be operated successively to successively carry upon their respective higher adding-wheels.

In testimony whereof I have signed my name to this specification in the presence of two subscribing witnesses.

GEORGE L. MARTIN.

Witnesses:
ROBT. F. MERRILEES,
JOSHUA W. W. CAPEN.